(12) United States Patent
Lin

(10) Patent No.: US 12,274,943 B2
(45) Date of Patent: Apr. 15, 2025

(54) SCREEN GENERATION METHOD AND APPARATUS, COMPUTER DEVICE, STORAGE MEDIUM AND PROGRAM PRODUCT

(71) Applicant: Tencent Technology (Shenzhen) Company Limited, Shenzhen (CN)

(72) Inventor: Lingyun Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 277 days.

(21) Appl. No.: 17/963,137

(22) Filed: Oct. 10, 2022

(65) Prior Publication Data
US 2023/0031217 A1 Feb. 2, 2023

Related U.S. Application Data

(63) Continuation of application No. PCT/CN2021/142452, filed on Dec. 29, 2021.

(30) Foreign Application Priority Data

Feb. 8, 2021 (CN) .......................... 202110182921.4

(51) Int. Cl.
*A63F 13/56* (2014.01)
*A63F 13/52* (2014.01)
*A63F 13/837* (2014.01)

(52) U.S. Cl.
CPC .............. *A63F 13/56* (2014.09); *A63F 13/52* (2014.09); *A63F 13/837* (2014.09); *A63F 2300/6607* (2013.01)

(58) Field of Classification Search
CPC ........ A63F 13/56; A63F 13/52; A63F 13/837; A63F 2300/6607; A63F 13/55; A63F 13/58; A63F 13/57; A63F 13/573; A63F 13/577

See application file for complete search history.

(56) References Cited

U.S. PATENT DOCUMENTS 11,679,331 B2 * 6/2023 Li .......................... A63F 13/56
463/31
2012/0252575 A1 10/2012 Iida et al.
(Continued)

FOREIGN PATENT DOCUMENTS

CN 109731330 A 5/2019
CN 110465090 A 11/2019
(Continued)

OTHER PUBLICATIONS

Tencent Technology, ISR, PCT/CN2021/142452, Mar. 30, 2022, 3 pgs.
(Continued)

*Primary Examiner* — David L Lewis
*Assistant Examiner* — Matthew D Hoel
(74) *Attorney, Agent, or Firm* — Morgan, Lewis & Bockius LLP

(57) ABSTRACT

Disclosed is a screen generation method performed by a computer device, including: generating a match screen between a first virtual object and at least one second virtual object, the first virtual object being controlled by a computer device, and the second virtual object being controlled by a user account; playing an object switching animation when the first virtual object satisfies a target condition, the object switching animation being used to render a generation effect of switching a target virtual part of the first virtual object to obtain a switched first virtual object; and generating a match screen between the switched first virtual object and the at (Continued)

least one second virtual object when the playing of the object switching animation ends, a confrontation mode corresponding to the switched first virtual object being different from a confrontation mode corresponding to the first virtual object before the switch.

20 Claims, 11 Drawing Sheets

(56) References Cited

U.S. PATENT DOCUMENTS

| | | | |
|---|---|---|---|
| 2020/0330868 A1* | 10/2020 | Fan | A63F 13/65 |
| 2022/0047941 A1* | 2/2022 | Chen | A63F 13/2145 |
| 2022/0152496 A1* | 5/2022 | Liu | A63F 13/92 |
| 2022/0266143 A1* | 8/2022 | Feng | A63F 13/53 |
| 2022/0305384 A1* | 9/2022 | Liu | A63F 13/5378 |
| 2022/0379218 A1* | 12/2022 | Hu | A63F 13/833 |
| 2023/0124014 A1* | 4/2023 | Liu | A63F 13/537 463/31 |
| 2023/0230315 A1* | 7/2023 | Chai | G06F 3/04842 |
| 2023/0330530 A1* | 10/2023 | Yan | A63F 13/52 |
| 2023/0347240 A1* | 11/2023 | Huo | G06T 15/00 |
| 2023/0372819 A1* | 11/2023 | Ni | A63F 13/837 |
| 2024/0091644 A1* | 3/2024 | Jiang | A63F 13/56 |
| 2024/0198221 A1* | 6/2024 | Li | A63F 13/5372 |

FOREIGN PATENT DOCUMENTS

| | | |
|---|---|---|
| CN | 111298430 A | 6/2020 |
| CN | 111330267 A | 6/2020 |
| CN | 111760281 A | 10/2020 |
| CN | 111921188 A | 11/2020 |
| CN | 112190931 A | 1/2021 |
| CN | 112316423 A | 2/2021 |
| CN | 112774189 A | 5/2021 |
| JP | 2020195829 A | 12/2020 |
| TW | 202039041 A | 11/2020 |
| TW | M 604227 U | 11/2020 |

OTHER PUBLICATIONS

Bilibili video, "[Spoiler Warning][Octopath Traveler] Finally Hides the Boss Demon God Galdera Raiders", Author: Water Machine, Jun. 16, 2019, 3 pgs., Retrieved from the Internet: https://www.bilibili.com/video/BV1W441157f7/?p=3&spm_id_from=pageDriver.

Gamersky video, "'Sekiro' Toughness System, Rules of the Week and the Ghost of Resentment Play", NGA Forum Author: Ayanokoji, Apr. 17, 2019, 8 pgs., Retrieved from the Internet: https://www.gamersky.com/handbook/201904/1174207.shtml.

Bilibili video, "Ultra-Concentrated Evidence Raiders Extreme Male Fire Dragon Upper Hunting Battle", Aug. 10, 2018, 6 pgs., Retrieved from the Internet: https://www.bilibili.com/video/BV1Ps411u71C/.

Bilibili video, "5.0 Super Condensed Evidence Guide Doom Shadow Yamauroti + Hades Annihilation War", Aug. 3, 2019, 7 pgs., Retrieved from the Internet: https://www.bilibili.com/video/BV191411u7R4/.

Tencent Technology, WO, PCT/CN2021/142452, Mar. 30, 2022, 5 pgs.

Tencent Technology, IPRP, PCT/CN2021/142452, Aug. 3, 2023, 6 pgs.

* cited by examiner

SCREEN GENERATION METHOD AND APPARATUS, COMPUTER DEVICE, STORAGE MEDIUM AND PROGRAM PRODUCT

CROSS-REFERENCE TO RELATED APPLICATIONS

This application is a continuation application of PCT Patent Application No. PCT/CN2021/142452, entitled "PICTURE GENERATION METHOD AND APPARATUS, AND COMPUTER DEVICE, STORAGE MEDIUM AND PROGRAM PRODUCT" filed on Dec. 29, 2021, which claims priority to Chinese Patent Application No. 202110182921.4, filed with the State Intellectual Property Office of the People's Republic of China on Feb. 8, 2021, and entitled "SCREEN DISPLAY METHOD, APPARATUS, TERMINAL, AND STORAGE MEDIUM", all of which are incorporated herein by reference in their entirety.

FIELD OF THE TECHNOLOGY

Embodiments of this application relate to the field of computer and Internet technologies, and in particular, to a screen generation method and apparatus, a computer device, a storage medium, and a program product.

BACKGROUND OF THE DISCLOSURE

With the development of a computer technology, virtual objects are applied in more and more scenes. For example, many virtual objects are applied in animations or games. The virtual objects play different roles in the animations or games. The behavior of the virtual objects in the scenes is controlled by users, and the virtual objects can be controlled to interact with each other. For example, in some shooting games on mobile terminals, virtual objects controlled by user accounts in the game scene provided by the game match can use virtual tools to produce confrontation to virtual objects controlled by other user accounts, and at the same time, can also receive confrontation of the virtual objects controlled by other user accounts.

However, due to the time-consuming manual operation, the mode of controlling the virtual objects for confrontation through the user accounts consumes much time, resulting in low efficiency of controlling the virtual objects, which leads to a long time of occupying computer resources and a waste of the computer resources.

SUMMARY

According to embodiments provided in this application, a screen generation method and apparatus, a computer device, a storage medium, and a program product are provided. A screen generation method is provided, performed by a computer device, the method including:

generating a match screen between a first virtual object and at least one second virtual object, the first virtual object being controlled by the computer device, and the second virtual object being controlled by a user account;

playing an object switching animation when the first virtual object satisfies a target condition, the object switching animation being used to render a generation effect of switching a target virtual part of the first virtual object to obtain a switched first virtual object; and generating a match screen between the switched first virtual object and the at least one second virtual object when the playing of the object switching animation ends, a confrontation mode corresponding to the switched first virtual object being different from a confrontation mode corresponding to the first virtual object before the switch.

A screen generation apparatus is provided, including:

a first screen generation module, configured to generate a match screen between a first virtual object and at least one second virtual object, the first virtual object being controlled by a computer device, and the second virtual object being controlled by a user account;

a switching animation playing module, configured to play an object switching animation when the first virtual object satisfies a target condition, the object switching animation being used to render a generation effect of switching a target virtual part of the first virtual object to obtain a switched first virtual object; and a second screen generation module, configured to generate a match screen between the switched first virtual object and the at least one second virtual object when the playing of the object switching animation ends, a confrontation mode corresponding to the switched first virtual object being different from a confrontation mode corresponding to the first virtual object before the switch.

A computer device is provided, including a memory and one or more processors, where the memory stores a computer-readable instruction, and when the computer-readable instruction is executed by the one or more processors, the computer device is caused to perform the foregoing screen generation method.

One or more non-transitory computer-readable storage media are provided, storing computer-readable instructions, the computer-readable instructions, when executed by one or more processors of a computer device, causing the computer device to perform the foregoing screen generation method.

A computer program product is provided, storing computer-readable instructions in a non-transitory computer-readable storage medium, the computer-readable instructions, when executed by a processor of a computer device, causing the computer device to implement operations of the foregoing screen generation method.

Details of one or more embodiments of this application are provided in the subsequent accompanying drawings and descriptions. Other features, objectives, and advantages of this application will become apparent from the specification, the accompanying drawings, and the claims.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following description show merely some embodiments of this application, and a person of ordinary skill in the art may obtain other accompanying drawings from these accompanying drawings without creative efforts.

DESCRIPTION OF EMBODIMENTS

Figure 1:
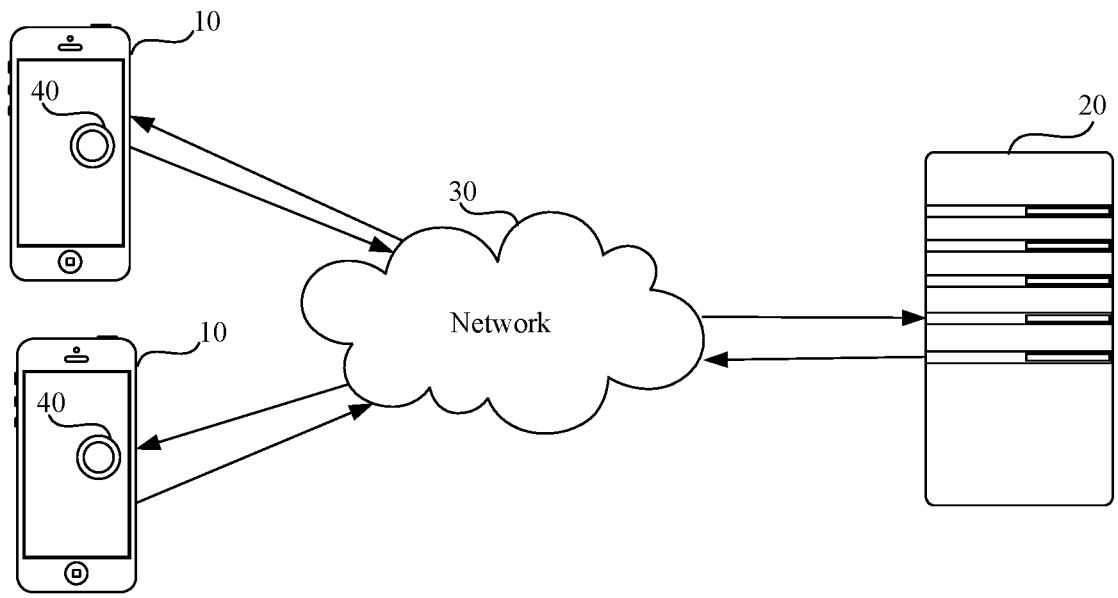
FIG. 1 is a schematic diagram of an implementation environment provided by an embodiment of this application.

To make objectives, technical solutions, and advantages of this application clearer, the following further describes implementations of this application in detail with reference to the accompanying drawings.

Before embodiments of this application are described, related terms involved in this application are explained first.

1. Virtual Scene

A virtual scene is a scene generated (or provided) when a client of an application (such as a game application) runs on a terminal. The virtual scene refers to a scene created for a virtual object to perform activities (such as game competition). The virtual scene may be, for example, a virtual house, a virtual island, or a virtual map. The virtual scene may be a simulated scene of the real world, or may be a semi-simulated semi-fictional scene, or may be an entirely fictional scene. The virtual scene may be a two-dimensional virtual scene, a 2.5-dimensional virtual scene, or a three-dimensional virtual scene, which is not limited in the embodiments of this application.

2. Virtual Object

A virtual object is a virtual character controlled by a user account/computer in an application. For example, the application is a game application. The virtual object is a game character controlled by the user account/computer in the game application. The virtual object may be in a human form, an animal form, a cartoon form, or another form, and this is not limited in this embodiment of this application. The virtual object may be presented in a 3D form or a 2D form, and this is not limited in this embodiment of this application.

In different game applications, operations performed by virtual objects controlled by a user account/computer may be different.

Certainly, in addition to the game applications, another type of application may also present a virtual object to a user and provide a corresponding function for the virtual object. for example, an augmented reality (AR) application, a social application, or an interactive entertainment application, which is not limited in the embodiments of this application. Besides, the form and corresponding function of the virtual object vary with different applications, and may be preset according to an actual requirement, which is not limited in the embodiments of this application.

3. Virtual Tool

A virtual tool is a tool that can be used by a virtual object in a virtual scene, including a long-range virtual tool and a short-range virtual tool. The remote virtual tool refers to a virtual tool capable of confronting a virtual object at a long distance from other virtual objects; and the short-range virtual tool refers to a virtual tool capable of launching a confrontation to other virtual objects at a short distance.

The screen generation method provided by this application is applied to a virtual scene, objects in the screen generation method are virtual objects, and the involved contents are all contents occurring in the virtual scene. Specifically, the method of this application can be applied to a virtual scene in a game, and the virtual objects involved in this application are virtual objects in the game.

As shown in FIG. 1, a schematic diagram of an implementation environment provided by an embodiment. The implementation environment may include a terminal 10, a server 20, and a network 30. There may be one or more terminals 10. A game application 40 is installed and runs in the terminal 10.

The terminal 10 may be a portable electronic device, such as a mobile phone, a tablet computer, a game console, an ebook reader, a multimedia playback device, and a wearable device. As shown in FIG. 1, the game application 40, such as a shooting game application, may be installed and run in the terminal 10. In some embodiments, the game application 40 may be an application that runs independently, or an application that depends on other applications to run, that is, other applications are parent applications, and the game application 40 is a child application. For example, the game application 40 is an application that depends on an AR application, a social application, an interactive entertainment application and the like.

The server 20 is configured to provide a back-end service to the game application 40 (for example, a shooting game application) in the terminal 10. For example, the server 20 may be a backend server of the game application 40. In some embodiments, the server 20 may be one server, a server cluster including a plurality of servers, or a cloud computing service center.

The terminal 10 may communicate with the server 20 through a network 30. The network 30 may be a wired network, or a wireless network.

Figure 2:
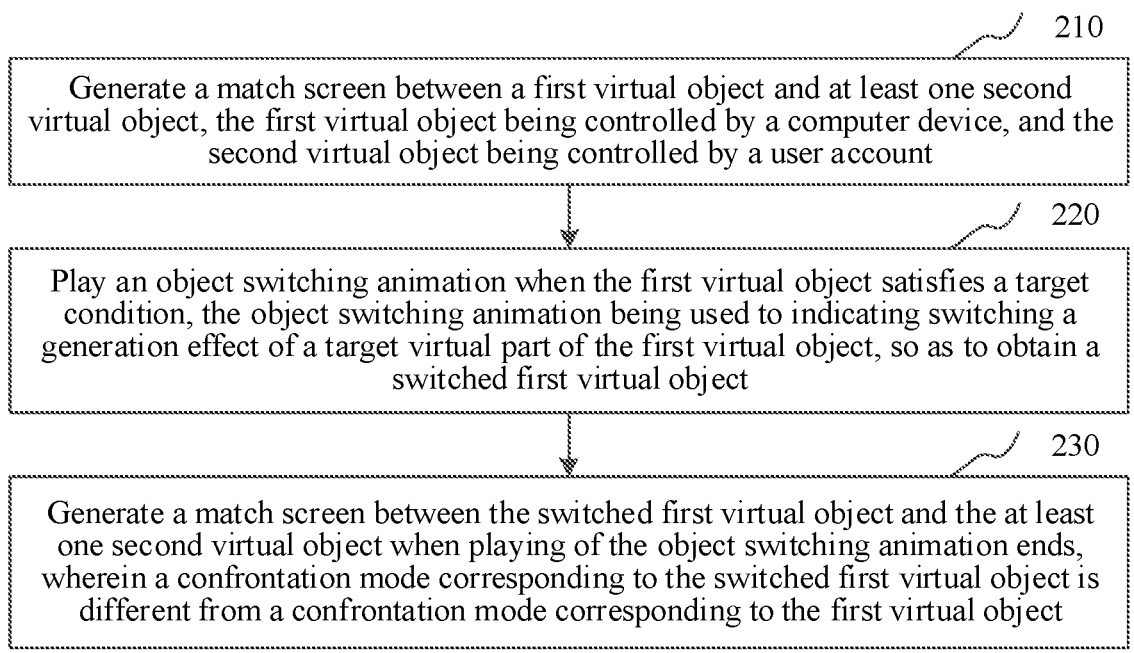
FIG. 2 is a flowchart of a screen generation method provided by an embodiment of this application.

As shown in FIG. 2, a flowchart of a screen generation method provided by an embodiment. The screen generation method in this application can be applied in the game application 40 (such as the shooting game application) in FIG. 1, and the screen generation method of this application can be executed by the terminal 10 in FIG. 1. The screen generation method may include the following steps:

Step 210, a match screen between a first virtual object and at least one second virtual object is generated, the first virtual object being controlled by a computer device, and the second virtual object being controlled by a user account.

The match screen refers to a screen in which there is a confrontation relationship. The confrontation relationship refers to a contrary relationship, for example, there may be a confrontation relationship between the first virtual object and the second virtual object.

The computer device, for example, may be the terminal in FIG. 1, the terminal can run a game application, a user interface is displayed in the game application, and a match screen between the first virtual object and the at least one second virtual object is generated in the user interface. The number of the second virtual objects may be arbitrary, for example, the number of the second virtual objects may be any one of 1, 2, 3 or 4. In some embodiments, a generated content of the match screen includes a first virtual object and at least one second virtual object; or the generated content of the match screen includes a first virtual object and parts of the at least one second virtual object; or the generated content of the match screen includes a first virtual object, but does not include at least one second virtual object; or the generated content of the match screen includes at least one second virtual object, but does not include a first virtual object; or the generated content of the match screen includes neither a first virtual object nor the at least one second virtual object. Optionally, the generated content of the match screen further includes a virtual scene corresponding to a game match between the first virtual object and the at least one second virtual object, or a part of the virtual scene, such as a virtual house, a virtual island or a virtual wasteland.

It should be understood that the generated content of the match screen between the first virtual object and the at least one second virtual object may be constantly changed as the game match progresses. For example, as the game match progresses, the generated content of the match screen is changed from including the at least one second virtual object but not the first virtual object to including the first virtual object and the at least one second virtual object. In this case, the virtual scene included in the match screen may or may not change.

The first virtual object refers to a virtual object controlled by a computer device, and the second virtual object refers to a virtual object controlled by a user account. That is, the game match between the first virtual object and the at least one second virtual object is a game match between a virtual object controlled by a computer and a virtual object controlled by at least one user account. One user account controls one or more second virtual objects, one second virtual object may be controlled by one or more user accounts, and more refers to at least two. The computer may control either one first virtual object or a plurality of first virtual objects. In the following embodiments, only one first virtual object controlled by the computer and the situation that each user account controls one second virtual object are taken as an example to introduce and illustrate technical solutions provided by the embodiments of this application, but this does not constitute a limitation to this application.

In some embodiments, a generation form of each second virtual object may be the same, for example, the generation form of each second virtual object is a virtual character form; or the generation form of each second virtual object may also be different, for example, the generation forms of some second virtual objects are virtual character forms, and the generation forms of some second virtual objects are virtual animal forms.

In some embodiments, the generation form of the first virtual object and the generation form of the second virtual object may be the same, for example, the generation forms of the first virtual object and the second virtual object are both virtual character forms; or the generation form of the first virtual object and the generation form of the second virtual object may be different, for example, the generation form of the first virtual object is the virtual animal form, and the generation form of the second virtual object is the virtual character form. The first virtual object may be a virtual object generated by the computer through an artificial intelligence (AI) technology. In the following embodiments, only the situation that the generation form of the first virtual object is the virtual animal form, and the generation form of the second virtual object is the virtual character form is taken as an example to introduce and illustrate the technical solutions provided by the embodiments of this application, but this does not constitute a limitation to this application.

Figure 3:
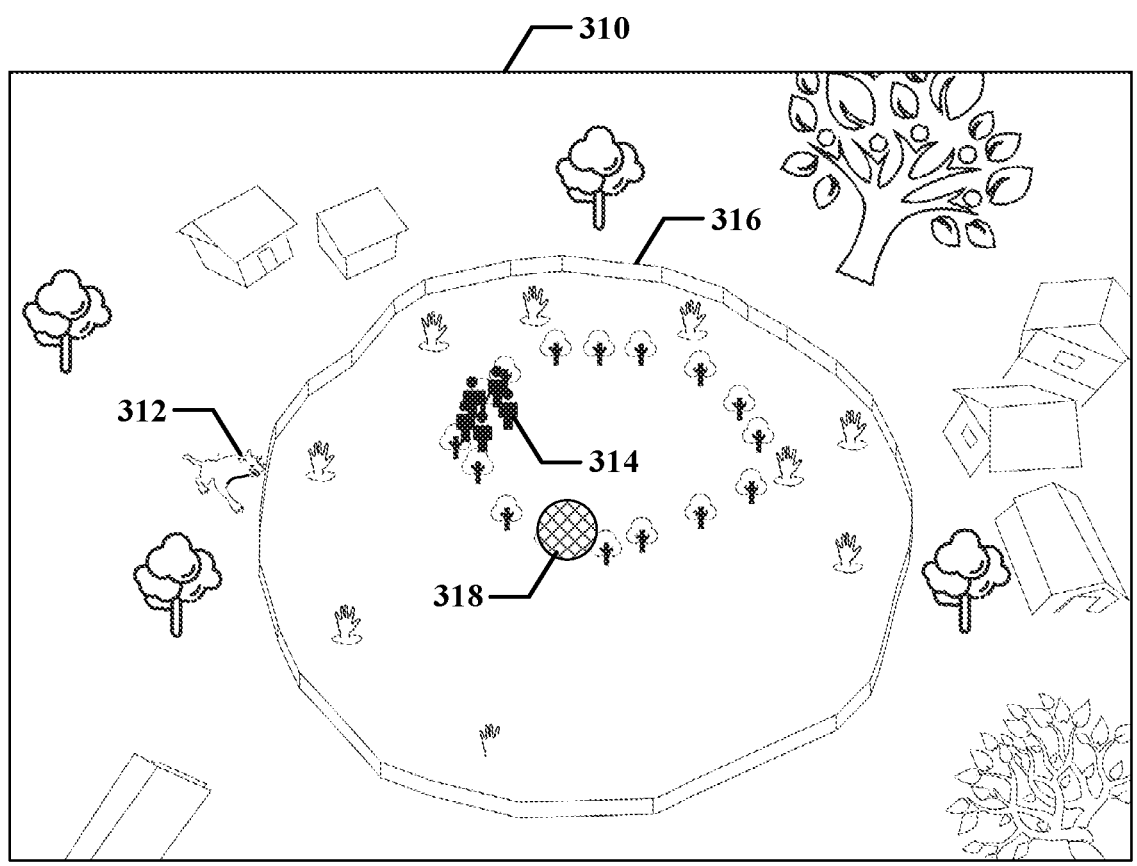
FIG. 3 is a schematic diagram of a match interface provided by an embodiment of this application.

For example, as shown in FIG. 3, a match screen 310 between a first virtual object and at least one second virtual object includes a first virtual object 312 and a second virtual object 314. The generation form of the first virtual object 312 is a virtual animal form, and as shown in FIG. 3, the first virtual object 312 is generated into a virtual hunter; and the generation form of the second virtual object 314 is a virtual character form. As shown in FIG. 3, the match screen 310 between the first virtual object and the at least one second virtual object further includes a virtual scene 316 corresponding to the game match between the first virtual object 312 and the at least one second virtual object 314. The virtual scene 316 may be an approximately circular virtual wasteland, which may be surrounded by virtual crops (such as virtual corn), and some virtual houses, virtual trees, virtual plants, etc.

When the game match between the first virtual object 312 and the at least one second virtual object 314 starts, a terminal may play an entrance animation of the first virtual object 312, the entrance animation is used to indicate the first virtual object 312 to move from an edge of the virtual scene 316 to a preset position in the virtual scene 316, and the preset position, for example, may be a center 318 of the virtual scene 316. When playing of the entrance animation of the first virtual object 312 ends, the first virtual object 312 and the at least one second virtual object 314 may respectively confront each other in confrontation modes that they can exert.

Step 220, an object switching animation is played when the first virtual object satisfies a target condition, the object switching animation being used to render a generation effect of switching a target virtual part of the first virtual object, so as to obtain a switched first virtual object.

In the game match between the first virtual object and the at least one second virtual object, if the first virtual object satisfies the target condition, the terminal may play the object switching animation, and the object switching animation is used to indicate switching the generation effect of the target virtual part of the first virtual object.

In some embodiments, the target virtual part includes a virtual head, and the generation effect of the target virtual part includes the number of the virtual heads; or the target virtual part includes a virtual skin, and the generation effect of the target virtual part includes the color of the virtual skin; or the target virtual part includes virtual eyes, and the generation effect of the target virtual part includes the number of the virtual eyes. It should be understood that the target virtual part may include a plurality of virtual parts at the same time, for example, including a virtual head and a virtual skin at the same time, and the generation effect of the target virtual part includes the number of the virtual heads and the color of the virtual skin.

In some embodiments, the target condition includes a change in an activity capability value interval corresponding to an activity capability value of the first virtual object; or the target condition includes a change in a confrontation value interval corresponding to a confrontation value produced by the first virtual object; or the target condition includes a change in a confrontation value interval corresponding to a confrontation value received by the first virtual object; or the target condition includes a change in a match progress duration corresponding to the game match between the first virtual object and the at least one second virtual object; or the target condition includes a change in the number of the at least one second virtual object. It should be understood that the target condition may also include a plurality of conditions at the same time, for example, the target condition includes the change in the activity capability value interval corresponding to the activity capability value of the first virtual object and the change in the confrontation value interval corresponding to the confrontation value produced by the first virtual object. The activity capability value is used to represent the strength of the activity capability of the virtual object, the larger the activity capability value, the stronger the activity capability of the virtual object, and the activity capability value, for example, may be a life value.

Figure 4:
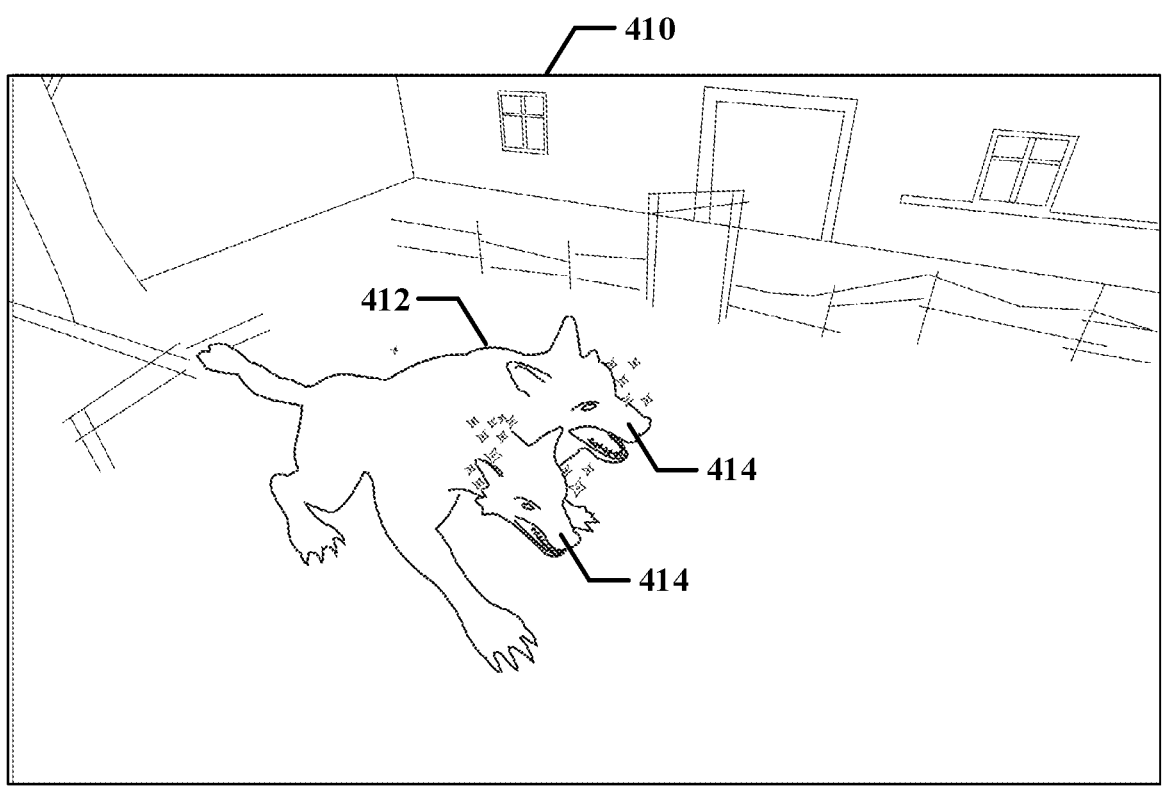
FIG. 4 is a schematic diagram of a playing interface provided by an embodiment of this application.

In some embodiments, when the terminal plays the object switching animation, the match screen of the first virtual object and the at least one second virtual object may be switched into a playing interface of the object switching animation; or when the terminal plays the object switching animation, the playing interface of the object switching animation is generated in the match screen of the first virtual object and the at least one second virtual object. For example, as shown in FIG. 4, the terminal only generates a playing interface 410 of the object switching animation in a user interface of a game application, and the playing interface 410 of the object switching animation includes a first virtual object 412. As shown in FIG. 4, the object switching animation is used to indicate that the number of virtual heads 414 of the first virtual object 412 is changed from one to two.

Step 230, a match screen between the switched first virtual object and the at least one second virtual object is generated when the object switching animation ends, where a confrontation mode corresponding to the switched first virtual object is different from a confrontation mode corresponding to the first virtual object.

There may be a confrontation relationship between the first virtual object and the second virtual object, the confrontation relationship refers to a contrary relationship, the first virtual object and the second virtual object may confront each other to reflect the confrontation relationship, the confrontation may be that the first virtual object actively executes the confrontation mode on the second virtual object, or the first virtual object passively executes the confrontation mode on the second virtual object in order to resist the damage of the second virtual object. The confrontation mode refers to the mode of confrontation, and the confrontation mode includes, but is not limited to at least one of shooting in a virtual environment of the game, spraying virtual spheres, launching a charge, and using the virtual spheres dropped in the virtual environment for confrontation.

When playing of the object switching animation ends, the terminal may generate a match screen between the switched first virtual object and the at least one second virtual object. That is, after playing of the object switching animation ends, the switched first virtual object continues to play a game match with the at least one second virtual object, for example, the first virtual object in the match screen before playing the object switching animation may be updated to the switched first virtual object, so as to obtain the match screen between the switched first virtual object and the at least one second virtual object. The first virtual object may confront the at least one second virtual object using its corresponding confrontation mode. In the embodiments of this application, after the generation effect of the target virtual part of the first virtual object is changed, the confrontation mode corresponding to the first virtual object may also be changed, that is, the confrontation mode corresponding to the switched first virtual object is different from the confrontation mode corresponding to the first virtual object. In some embodiments, the confrontation mode corresponding to the first virtual object is transformed from one confrontation mode to another confrontation mode, or from some confrontation modes to other confrontation modes; or one or more confrontation modes are added in the confrontation mode corresponding to the first virtual object on the basis of one confrontation mode or some confrontation modes; or one or more confrontation modes are reduced in the confrontation mode corresponding to the first virtual object on the basis of one or more confrontation modes.

In the process of a game match, the first virtual object confronts the at least one second virtual object in its corresponding confrontation mode, and the at least one second virtual object also confronts the first virtual object in its corresponding confrontation mode. In some embodiments, when the activity capability value of each second virtual object is zero, the first virtual object wins the game match; and when the activity capability value of the first virtual object is zero, each second virtual object wins the game match. The activity capability value of each second virtual object, the activity capability value of the first virtual object, a confrontation value produced by the confrontation mode corresponding to the first virtual object and a confrontation value produced by the confrontation mode corresponding to each second virtual object may all be set as required. For example, an initial activity capability value of the first virtual object is 1000, and an initial activity capability value of each second virtual object is 100.

In the above screen generation method, the match screen between the first virtual object and the second virtual object is generated, and when the first virtual object satisfies the target condition, the object switching animation is played, so that the generation effect of the target virtual part of the first virtual object is switched to obtain the switched first virtual object. When playing of the object switching animation ends, the match screen between the switched first virtual object and the at least one second virtual object is generated, since the confrontation mode of the switched first virtual object is different from the confrontation mode of the first virtual object before switching, the confrontation mode of the first virtual object is automatically updated, automatic control of the first virtual object is realized, a control efficiency of the virtual object is improved, so that time for occupying computer resources in the process of controlling the virtual object is shortened, and the computer resources in the process of controlling the virtual object are saved.

In some embodiments, the screen generation method provided by this application may be applied to simulated confrontation scenes with wild animals. For example, the second virtual object in this application is a virtual character controlled by user equipment, the first virtual object may be a wild animal, generated by the computer device, in the field, the first virtual object is controlled by the computer device to confront the second virtual object, and the ability to confront the wild animals is improved.

In some embodiments, the target condition includes the change in the activity capability value interval corresponding to the activity capability value of the first virtual object; the activity capability value interval corresponding to the activity capability value of the first virtual object includes n activity capability value intervals, n activity capability value intervals are continuous and non-overlapping, and n is a positive integer; in the above, when the first virtual object satisfies the target condition, the step of playing the object switching animation includes: when the activity capability value interval corresponding to the activity capability value of the first virtual object is changed from a $i^{th}$ activity capability value interval to a $(i+1)^{th}$ activity capability value interval, a $i^{th}$ switching animation is played, and i is a positive integer smaller than n. The object switching animation includes the $i^{th}$ switching animation, and the $i^{th}$ switching animation is used to indicate switching the target virtual part of the first virtual object from a $i^{th}$ generation effect to a $(i+1)^{th}$ generation effect.

The activity capability value of the first virtual object is divided into n continuous and non-overlapping activity capability value intervals. The n activity capability value intervals may be evenly divided or unevenly divided. The n activity capability value intervals may be represented in percentage form or numerical form.

For example, the activity capability value of the first virtual object is divided into the following 3 activity capability value intervals:

the $1^{st}$ activity capability value interval: [100% of the initial activity capability value, 66% of the initial activity capability value);

the $2^{nd}$ activity capability value interval: [66% of the initial activity capability value, 33% of the initial activity capability value); and the $3^{rd}$ activity capability value interval: [33% of the initial activity capability value, 0).

The initial activity capability value of the first virtual object may be preset or set as required, for example, taking the initial activity capability value of the first virtual object being 1000 as an example, the activity capability value of the first virtual object is divided into the following 3 activity capability value intervals:

the $1^{st}$ activity capability value interval: [1000, 660);

the $2^{nd}$ activity capability value interval: [660, 330); and the $3^{rd}$ activity capability value interval: [330, 0).

Based on this, the above step 220 may further include: when the activity capability value of the first virtual object is changed from the $i^{th}$ activity capability value interval to the $(i+1)^{th}$ activity capability value interval, the $i^{th}$ switching animation is played, and i is a positive integer smaller than n. The object switching animation includes the $i^{th}$ switching animation, and the $i^{th}$ switching animation is used to indicate switching the target virtual part of the first virtual object from the $i^{th}$ generation effect to the $(i+1)^{th}$ generation effect.

The generation effect of the target virtual part of the first virtual object is shown in different switching modes in each switching process. For example, the target virtual part of the first virtual object includes a virtual skin, and in each switching process, the virtual skin is switched into a new color instead of being switched to an already generated color. Or in the switching process, the generation effect of the target virtual part of the first virtual object may also be switched to the generated generation effect.

When the activity capability value of the first virtual object includes n activity capability value intervals, the generation effect of the target virtual part of the first virtual object also includes n generation effects, so that the first virtual object switches at most (n−1) times in the game match, and the object switching animation includes at least (n−1) switching animations. For example, when the activity capability value of the first virtual object is changed from the $i^{th}$ activity capability value interval to the $(i+1)^{th}$ activity capability value interval in the n activity capability value intervals, the $i^{th}$ switching animation is played by the game application, and the $i^{th}$ switching animation is used to indicate switching the target virtual part of the first virtual object from the $i^{th}$ generation effect to the $(i+1)^{th}$ generation effect.

In the embodiment, when the activity capability value of the first virtual object is changed from the $i^{th}$ activity capability value interval to the $(i+1)^{th}$ activity capability value interval, the $i^{th}$ switching animation is played, so that the switching animation to be played is automatically determined as the activity capability value interval to which the activity capability value belongs changes, the efficiency of determining the animation is improved, the process of determining the animation is simplified, and the efficiency and smoothness of playing the animation are improved.

In some embodiments, the target virtual part includes a virtual head; the $i^{th}$ generation effect includes the number of the virtual heads is i; and the $(i+1)^{th}$ generation effect includes the number of the virtual heads is (i+1).

For example, the activity capability value of the first virtual object is divided into 3 activity capability value intervals, which respectively are a $1^{st}$ activity capability value interval, a $2^{nd}$ activity capability value interval and a $3^{rd}$ activity capability value interval, the target virtual part includes the virtual head, and the number of the virtual heads may be 1, 2 or 3. When the activity capability value interval corresponding to the activity capability value of the first virtual object is the $1^{st}$ activity capability value interval, the number of the virtual head is 1, when the activity capability value interval corresponding to the activity capability value of the first virtual object is the $2^{nd}$ activity capability value interval, the number of the virtual heads is 2, and when the activity capability value interval corresponding to the activity capability value of the first virtual object is the $3^{rd}$ activity capability value interval, the number of the virtual heads is 3. That is, a corresponding relationship between the activity capability value interval and the generation effect of the target virtual part is shown as follows:

the $1^{st}$ activity capability value interval: the number of the virtual head is 1;

the $2^{nd}$ activity capability value interval: the number of the virtual heads is 2; and the $3^{rd}$ activity capability value interval: the number of the virtual heads is 3.

In some embodiments, in the process of the terminal playing the object switching animation, the first virtual object enters a special state, and in this special state, the second virtual object cannot confront the first virtual object in its corresponding confrontation mode. After the generation effect of the target virtual part of the first virtual object is changed, the confrontation mode corresponding to the first virtual object may also be changed.

In the embodiment, the number of the virtual heads corresponding to different generation effects is different, so that the number of the virtual heads can be automatically updated according to the generation effects, the control efficiency of the virtual object is improved, and the computer resources in the process of controlling the virtual object are saved.

In some embodiments, the screen generation method further includes: when the activity capability value interval corresponding to the activity capability value of the first virtual object is changed from the $i^{th}$ activity capability value interval to the $(i+1)^{th}$ activity capability value interval, the confrontation mode corresponding to the first virtual object is switched from a $i^{th}$ type of confrontation mode to a $(i+1)^{th}$ type of confrontation mode; and the $(i+1)^{th}$ type of confrontation mode means that m confrontation modes are added on the basis of the confrontation mode included in the $i^{th}$ type of confrontation mode, and m is a positive integer.

For example, in each switching process, a confrontation mode is newly added for the first virtual object. For example, taking the situation that the activity capability value of the first virtual object is divided into 3 activity capability value intervals, the target virtual part includes the virtual head, and a confrontation mode is newly added for each switching as an example, the corresponding relationship between the activity capability value intervals and the generation effect of the target virtual part, as well as the confrontation mode is shown as follows:

the $1^{st}$ activity capability value interval: the number of the virtual head is 1, a first type of confrontation mode;

the $2^{nd}$ activity capability value interval: the number of the virtual heads is 2, a second type of confrontation mode; and the $3^{rd}$ activity capability value interval: the number of the virtual heads is 3, a third type of confrontation mode.

The first type of confrontation mode may include a first confrontation mode and a second confrontation mode. The second type of confrontation mode may include a first confrontation mode, a second confrontation mode and a third confrontation mode. The third type of confrontation mode may include a first confrontation mode, a second confrontation mode, a third confrontation mode and a fourth confrontation mode. The first confrontation mode includes the first virtual object waving a virtual tool, the second confrontation mode includes the first virtual object spraying a first virtual sphere, the third confrontation mode includes the first virtual object launching a charge, and the fourth confrontation mode includes using a second virtual sphere dropped in the virtual environment to confront.

In some embodiments, when the first virtual object does not confront the second virtual object in its corresponding confrontation mode, the first virtual object may be in an idle state. When being in the idle state, the first virtual object may be kept stationary or in a moving state; and when being in the moving state, the first virtual object may move within a certain range or along a certain route, and the moving state of the first virtual object may be determined by the game application in cooperation with an Idle animation.

In some embodiments, the terminal may determine the confrontation mode used currently by the first virtual object based on a state machine, or determine the confrontation mode used at a time after the current time of the first virtual object. That is, each confrontation mode in the confrontation modes corresponding to the first virtual object is a state in the state machine.

In the embodiment, when the activity capability value interval corresponding to the activity capability value of the first virtual object is changed, the confrontation mode of the first virtual object is automatically updated, the efficiency of updating the confrontation mode of the first virtual object is improved, and the computer resources consumed in the process of controlling the confrontation mode of the virtual object are saved.

In some embodiments, the confrontation mode corresponding to the first virtual object includes a first confrontation mode. The screen generation method further includes: a second virtual object that satisfies a first confrontation condition is selected from the at least one second virtual object to obtain a third virtual object; the first virtual object is controlled to move towards the third virtual object; and when the third virtual object falls within a confrontation range of the first virtual object, the first virtual object is controlled to confront the third virtual object in the first confrontation mode.

When the first virtual object confronts in the first confrontation mode, the terminal may select the second virtual object that satisfies the first confrontation condition from each second virtual object as the third virtual object.

In some embodiments, the first confrontation condition includes, but is not limited to at least one of the shortest distance from the first virtual object, the smallest activity capability value, the largest activity capability value, the largest received confrontation value, and the smallest received confrontation value. After the third virtual object is selected, the terminal may control the first virtual object to move towards the third virtual object.

In some embodiments, in the process of controlling the first virtual object to move towards the third virtual object, if the user account triggers the third virtual object to move, the terminal may control the first virtual object to always move towards the third virtual object; or may reselect a third virtual object, and control the first virtual object to move towards the reselected third virtual object; or the terminal may further control the first virtual object to move towards a position where the third virtual object is selected.

When the third virtual object falls within the confrontation range of the first virtual object, the terminal controls the first virtual object to confront the third virtual object in the first confrontation mode. The confrontation range of the first virtual object may be determined according to a specific type of the first confrontation mode. For example, the first confrontation mode includes the first virtual object waving the virtual tool to confront, and the confrontation range of the first virtual object may include a fan-shaped area, for example, the fan-shaped area in a direction that the first virtual object faces when waving the virtual tool. The size of the fan-shaped area may be preset or set as required, for example, an angle of the fan-shaped area is 160 degrees, and a radius is 2 meters. When the third virtual object falls within the confrontation range of the first virtual object, and if there are other second virtual objects that also fall within the confrontation range of the first virtual object, the first confrontation mode used by the first virtual object may also confront the other second virtual objects.

In the embodiment, the first virtual object is controlled to move towards the third virtual object selected from each second virtual object, so that the first virtual object is automatically controlled to move towards the third virtual object, and the efficiency of controlling the first virtual object to move is improved. The first virtual object is controlled to move within the confrontation range of the third virtual object, so that triggering of confrontation can be accelerated, the efficiency of producing confrontation is improved, and the computer resources consumed by triggering the confrontation are saved.

In some embodiments, the confrontation mode corresponding to the first virtual object includes a second confrontation mode. The screen generation method further includes: the number of confrontations of the second confrontation mode is determined based on the generation effect of the target virtual part of the first virtual object; as for a $5^{th}$ confrontation in the number of confrontations, a second virtual object corresponding to the 5th confrontation is determined from the at least one second virtual object, and s is a positive integer; and the first virtual object is controlled to confront the second virtual object corresponding to the $5^{th}$ confrontation in the second confrontation mode.

When the first virtual object uses the second confrontation mode to confront, the terminal may obtain the generation effect of the target virtual part of the first virtual object, and determine the number of confrontations of the second confrontation mode based on the generation effect of the target virtual part. For example, when the target virtual part includes a virtual head, the number of confrontations of the second confrontation mode may be determined according to the number of the virtual heads, for example, the number of confrontations is equal to the number of the virtual heads. When the target virtual part includes a virtual skin, the number of confrontations may be determined according to the color of the virtual skin, the color of the virtual skin is different, and the number of confrontations of the second confrontation mode is also different. For example, when the virtual skin is green, the number of confrontations of the second confrontation mode is 1; when the virtual skin is yellow, the number of confrontations of the second confrontation mode is 2; and when the virtual skin is red, the number of confrontations of the second confrontation mode is 3. As for the $5^{th}$ confrontation in the number of confrontations, the terminal may determine the second virtual object corresponding to the $5^{th}$ confrontation from each second virtual object.

In some embodiments, the second virtual object corresponding to the 5th confrontation may be selected randomly, or may be selected from each second virtual object according to certain conditions, for example, the second virtual object with the smallest distance from the first virtual object or the smallest activity capability value may be selected as the second virtual object corresponding to the $5^{th}$ confrontation, the second virtual object corresponding to each confrontation may be the same or different, that is, for example, when there is a second virtual object that has not been selected, the second virtual object that has been selected is not selected, and when there is no second virtual object that has not been selected for selection, the second virtual object that has been selected may be selected.

In each process of confrontation, after determining the second virtual object corresponding to the confrontation, the first virtual object may be controlled to confront the second virtual object corresponding to the confrontation in the second confrontation mode. The confrontation value of the second confrontation mode may be determined according to the specific type of the second confrontation mode.

In the embodiment, the number of confrontations of the second confrontation mode is determined based on the generation effect of the target virtual part of the first virtual object, the second virtual object corresponding to each confrontation is determined, the second confrontation mode is used to confront the second virtual object corresponding to each confrontation, so that the first virtual object is automatically controlled to confront the second virtual object, the efficiency of controlling the first virtual object is improved, and thus the computer resources consumed in the process of controlling the first virtual object to confront are saved.

In some embodiments, the second confrontation mode includes the first virtual object spraying a first virtual sphere, and after the controlling the first virtual object to confront the second virtual object corresponding to the $s^{th}$ confrontation in the second confrontation mode, the method further includes: when the first virtual sphere falls on the ground, an immediate confrontation calculation is performed on a second virtual object within a first calculation range; and after the first virtual sphere falls on the ground, a continuous confrontation calculation is performed on a second virtual object within a second calculation range, the second calculation range being larger than the first calculation range.

The first virtual sphere includes, but is not limited to at least one of a virtual fireball or a virtual iceball. A moving trajectory of the first virtual sphere may be preset or set as required, for example, may be a parabola. A starting point, an ending point and an initial speed (the initial speed may be configured by the game designer) of the first virtual sphere are known, and based on a parabola calculation formula, a position of the first virtual sphere in each frame may be calculated. After the first virtual sphere falls on the ground, an immediate confrontation may be generated on the second virtual object within the first calculation range; and then a continuous confrontation may be generated on the second virtual object within the second calculation range. In the embodiments of this application, the first calculation range is smaller than the second calculation range, for example, the first calculation range is a circular range with a radius of 1 meter, the second calculation range is a circular range with a radius of 2.5 meters, and a center of the first calculation range coincides with a center of the second calculation range. A duration of the continuous confrontation may be preset or set as required, for example, the duration of the continuous confrontation may be any one of 5 seconds, 10 seconds, 15 seconds or 20 seconds.

For example, taking the situation that the first virtual object is a virtual hunter, the target virtual part of the first virtual object includes a virtual head, the generation effect of the target virtual part includes the number of the virtual heads, and the second confrontation mode includes spraying the first virtual sphere as an example, the process of the second confrontation mode is introduced and illustrated.

Figure 5:
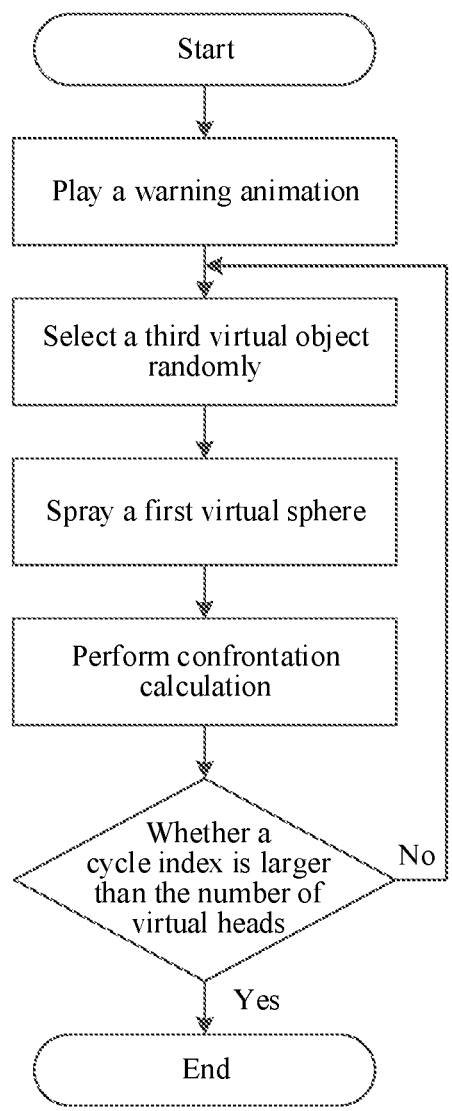
FIG. 5 is a schematic diagram of a process of a confrontation mode provided by an embodiment of this application.
Figure 6:
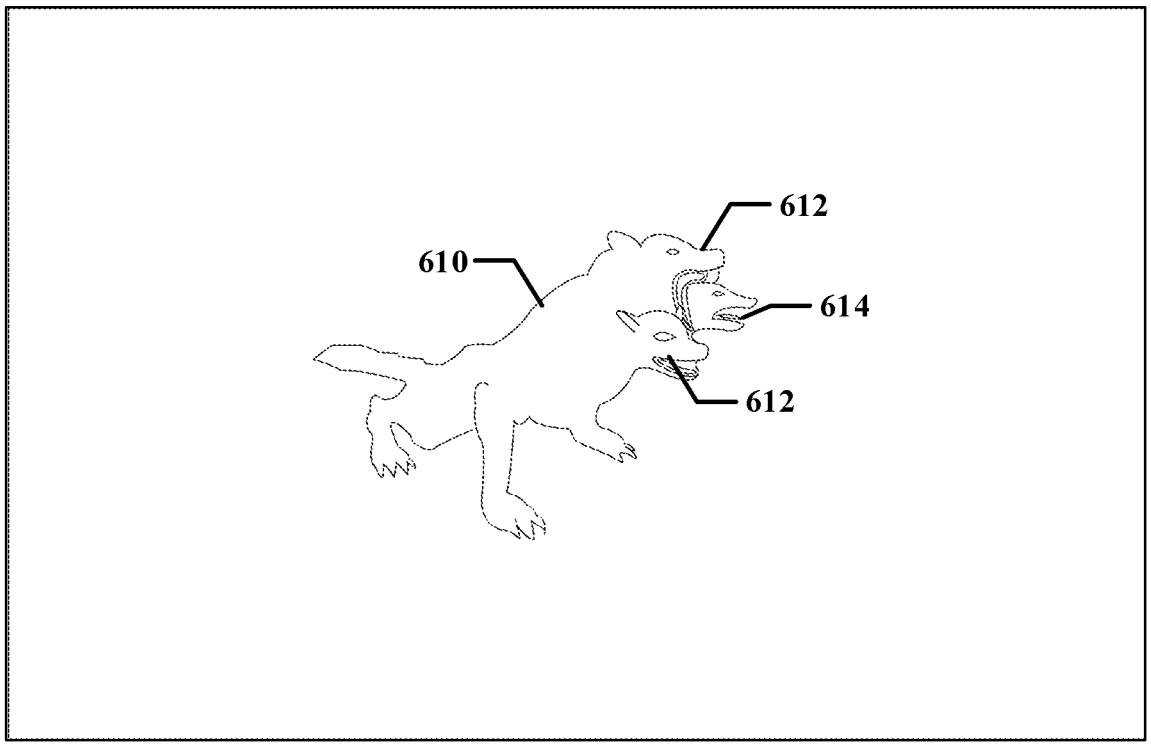
FIG. 6 is a schematic diagram of a warning animation provided by an embodiment of this application.

As shown in FIG. 5, when the first virtual object uses the second confrontation mode to confront, the terminal may play a warning animation firstly, and the warning animation may last for X seconds (X is a positive number, for example, X is 3 seconds). For example, as shown in FIG. 6, the warning animation is that the first virtual object 610 looks up and shakes all virtual heads 612 towards a preset point (such as a midpoint) in the virtual scene, and at the same time, a flame effect 614 appears in the mouths of the virtual heads 612 of the first virtual object 610.

As shown in FIG. 5, a third virtual object may be selected randomly from the at least one second virtual object while playing the warning animation or after playing the warning animation. After playing of the warning animation ends, the first virtual object is controlled to spray the first virtual sphere, and the first virtual sphere falls on the ground after a parabolic motion and generates a confrontation. When a confrontation calculation is performed, the game application first calculates the immediate confrontation with the first calculation range with a landing point as the center, and then may create range effects with the second calculation range with the landing point as the center, and calculate the continuous confrontation with the second calculation range.

As shown in FIG. 5, after spraying the first virtual sphere, whether the number of spraying (cycle index) of the first virtual sphere is larger than (or equal to) the number of the virtual heads of the first virtual object may be determined. If yes, the second confrontation mode is stopped; and if no, the first virtual sphere is sprayed again. Optionally, each time the first virtual object sprays the first virtual sphere, different virtual heads may be adopted to spray the first virtual sphere, since the number of spraying of the first virtual sphere is equal to the number of the virtual heads of the first virtual object, before stopping the second confrontation mode, each virtual head of the first virtual object may spray the first virtual sphere once.

In the embodiment, during the landing of the first virtual sphere, the immediate confrontation and the continuous confrontation are automatically calculated, so that the calculation efficiency of the confrontation can be improved.

In some embodiments, the confrontation mode corresponding to the first virtual object includes a third confrontation mode. The above method further includes: a second virtual object that satisfies a second confrontation condition is selected from the at least one second virtual object to obtain a fourth virtual object; a confrontation preparation range is determined based on position information of the fourth virtual object; the first virtual object is controlled to move to an edge of the confrontation preparation range, and the first virtual object is controlled to move along the edge of the confrontation preparation range; and when movement satisfies a movement stop condition, the first virtual object is controlled to confront the fourth virtual object in the third confrontation mode.

When the first virtual object uses the third confrontation mode to confront, the terminal may select a fourth virtual object from each second virtual object according to the second confrontation condition. The second confrontation condition includes any one of the following: the shortest distance from the first virtual object, the smallest activity capability value, the largest activity capability value, the largest received confrontation value, and the smallest received confrontation value. After the fourth virtual object is selected, the confrontation preparation range may be determined based on the position information of the fourth virtual object, and the confrontation preparation range is used for the first virtual object to move to warn a user.

The confrontation preparation range includes any one of the following: a circle, a square, a triangle and an irregular closed shape. For example, when the confrontation preparation range includes the circle, the confrontation preparation range may be a range with the position of the fourth virtual object as the center and a radius of 10 meters. After the fourth virtual object is selected, if the position of the fourth virtual object is changed, the position of the fourth virtual object when the fourth virtual object is selected is taken as the center.

After the confrontation preparation range is determined, the first virtual object is controlled to move to the edge of the confrontation preparation range, and move along the edge of the confrontation preparation range. The embodiments of this application does not limit an initial moving direction of the first virtual object when it moves along the edge of the confrontation preparation range, optionally, the initial moving direction includes a clockwise direction or a counterclockwise direction, and the direction with a sufficient moving space is selected as the initial moving direction of the first virtual object.

Figure 7:
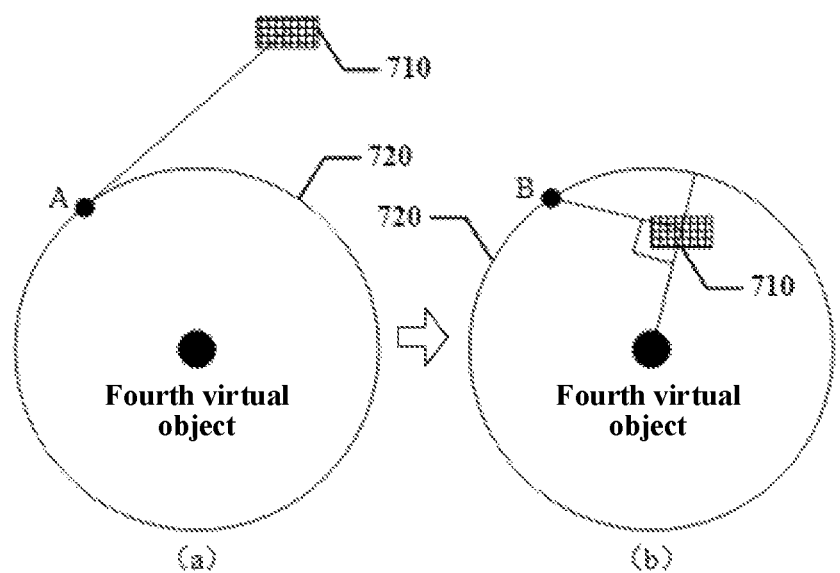
FIG. 7 is a schematic diagram of a confrontation preparation range provided by an embodiment of this application.

For example, taking the confrontation preparation range being the circle as an example, if the first virtual object is located outside the confrontation preparation range, as shown in (a) of FIG. 7, a tangent line is made to the confrontation preparation range 720 at the position of the first virtual object 710 to obtain a tangent point A, then the first virtual object is controlled to move towards the tangent point A, and after reaching the tangent point A, the first virtual object is controlled to move along the edge of the confrontation preparation range 720. If the first virtual object is located within the confrontation preparation range, as shown in (b) of FIG. 7, a vertical line is made on a connecting line between the first virtual object 710 and the center of the confrontation preparation range 720 at the position of the first virtual object 710 to obtain an intersection point B of the vertical line and the edge of the confrontation preparation range 720, then the first virtual object 710 is controlled to move towards the intersection point B, and after reaching the intersection point B, the first virtual object is controlled to move along the edge of the confrontation preparation range 720.

When movement of the first virtual object satisfies the movement stop condition, the first virtual object may be controlled to confront the fourth virtual object in the third confrontation mode. The movement stop condition may be determined according to the duration of movement or the type of the confrontation preparation range. For example, the movement stop condition may include the first virtual object moving at the edge of the confrontation preparation range for Y seconds, where Y is a positive number, for example, 3 seconds or 4 seconds. When the confrontation preparation range includes the square or the triangle, the movement stop condition may include that the first virtual object moves to the nearest vertex, and the vertex refers to an intersection point between edges in the square or the triangle. The terminal may perform the confrontation calculation according to the type of the third confrontation mode.

In the embodiment, the first virtual object is controlled to move to the edge of the confrontation preparation range of the fourth virtual object and move along the edge of the confrontation preparation range, when movement satisfies the movement stop condition, the first virtual object is controlled to confront the fourth virtual object in the third confrontation mode, so that the first virtual object is automatically controlled to move and confront, the efficiency of controlling the first virtual object is improved, thus the time for controlling the first virtual object is shortened, and the computer resources consumed in the process of controlling the first virtual object are saved.

In some embodiments, the third confrontation mode includes the first virtual object launching a charge against the fourth virtual object. The screen generation method further includes: in the charging process of the first virtual object, a charging confrontation range is determined in real time based on real-time position information of the first virtual object; and an immediate confrontation calculation is performed on a second virtual object within the charging confrontation range.

The charge may be a uniform motion, an acceleration motion or a deceleration motion. The shape and size of the charging confrontation range may be preset or set as required. For example, the charging confrontation range may be a circular area with the real-time position of the first virtual object as a center and a radius of 3 meters. The second virtual objects within the charging confrontation range may all be confronted.

Figure 8:
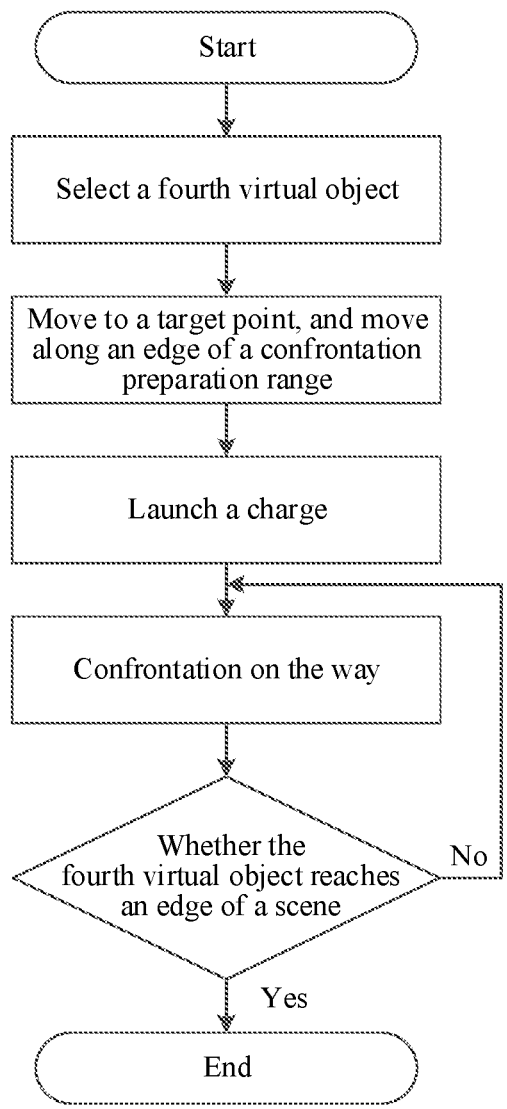
FIG. 8 is a schematic diagram of a process of a confrontation mode provided by another embodiment of this application.
Figure 9:
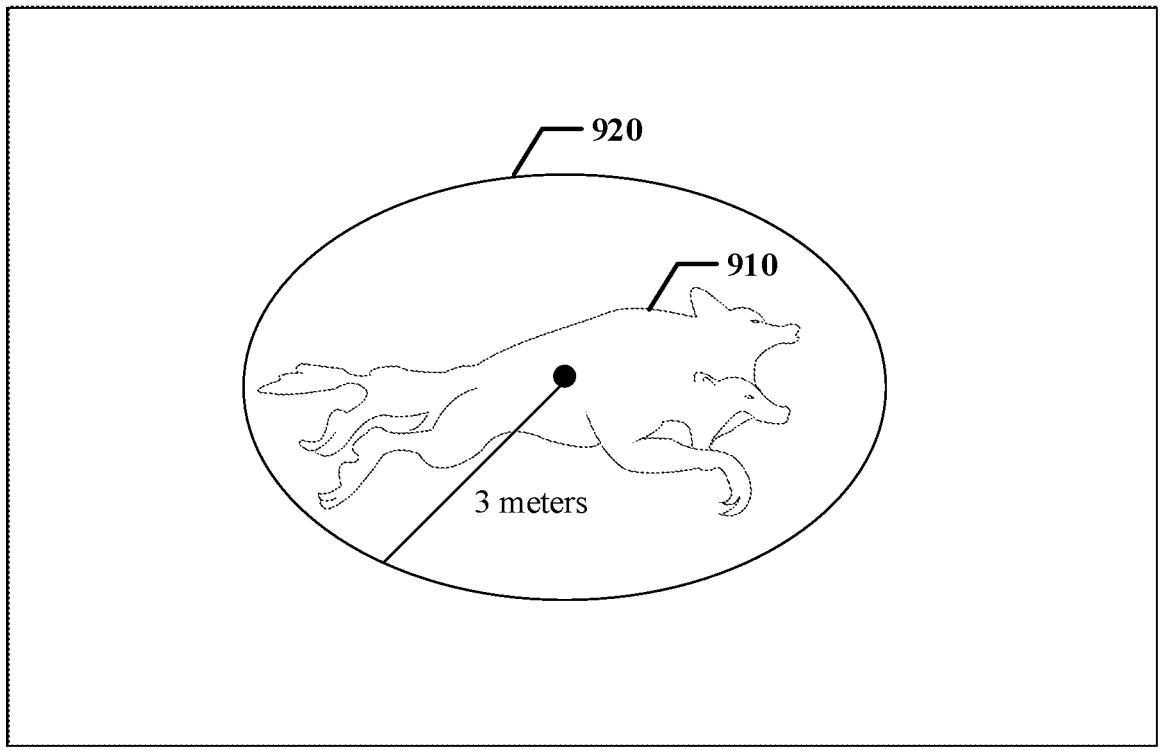
FIG. 9 is a schematic diagram of confrontation calculation provided by an embodiment of this application.

When the first virtual object launches the charge against the fourth virtual object, the position of the fourth virtual object may be changed compared with the position when the fourth virtual object is selected, and at this time, the first virtual object may be controlled to charge at the position of the fourth virtual object when launching the charge. Taking the situation that the first virtual object is a virtual hunter, and the third confrontation mode includes the first virtual object launching a charge against the fourth virtual object as an example, as shown in FIG. 8, the fourth virtual object is selected from each second virtual object, after the fourth virtual object is determined, the confrontation preparation range and target points on the confrontation preparation range are determined based on the position information of the fourth virtual object, the target points, for example, are the tangent point A and the intersection point B in FIG. 7, and the first virtual object is controlled to move towards the target points and move along the edge of the confrontation preparation range. This process may be equivalent to a warning stage of the third confrontation mode. When movement satisfies the movement stop condition, the first virtual object is controlled to launch a charge to the fourth virtual object, and the charge may be at a uniform speed. Before launching the charge, an animation of the first virtual object turning around and turning back may be played firstly, and the effect of the animation is to make the first virtual object face the fourth virtual object. In the charging process, the first virtual object confronts on the way, and as shown in FIG. 9, the confrontation calculation is to produce the immediate confrontation within a circular area 920 with the first virtual object 910 as a center and a radius of 3 meters.

In some embodiments, when the charge of the first virtual object satisfies certain conditions, for example, when a duration of the charge reaches a preset duration or the first virtual object reaches a preset position, the charge is stopped. As shown in FIG. 8, with reaching the edge of the virtual scene as a charging stop condition, in the charging process of the first virtual object, whether the first virtual object reaches the edge of the virtual scene may be determined, and if so, the charge is stopped.

In the embodiment, in the charging process of the first virtual object, the charging confrontation range is determined in real time based on the real-time position information of the first virtual object, so that the charging confrontation range can be updated in real time with the position of the first virtual object, and the accuracy of the charging confrontation range is improved.

In some embodiments, the confrontation mode corresponding to the first virtual object includes a fourth confrontation mode, and the fourth confrontation mode includes confronting with a second virtual sphere dropped in the virtual scene. The screen generation method further includes: a match range of the first virtual object and the at least one second virtual object is obtained; t points are selected from at least one point included in the match range, where t is a positive integer; a drop warning animation corresponding to the t points is played, where the drop warning animation corresponding to the t points is used to indicate that the second virtual sphere is about to drop at the t points; and when playing of the drop warning animation corresponding to the t points ends, a sphere drop animation corresponding to the t points is played, where the sphere drop animation corresponding to the t points is used to indicate that the second virtual sphere is dropped at the t points.

Figure 10:
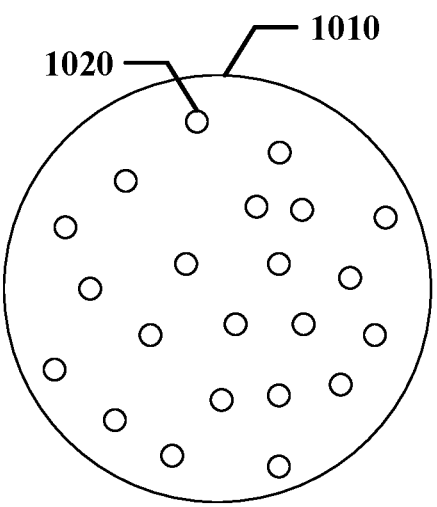
FIG. 10 is a schematic diagram of point selection provided by an embodiment of this application.

When the first virtual object confronts in the fourth confrontation mode, the terminal may obtain the match range of the first virtual object and the at least one second virtual object firstly, and the match range may be the above virtual scene, for example, the virtual scene 316 shown in FIG. 3, or a part of the above virtual scene. As shown in FIG. 10, a plurality of points 1020 are preset within the match range 1010, a radius of each point may be the same or different, and the terminal may select t points from each point 1020, for example, 3 points.

In some embodiments, the terminal may randomly select the t points from each point, or select the t points according to certain conditions, for example, the t points may be selected from each point according to the conditions that a distance between every two points is equal to or larger than 4 meters, and the radius of the points is equal to or larger than 1.5 meters.

The terminal may play the drop warning animation corresponding to the t points, for example, the drop warning animation corresponding to the t points is that there is a shadow at the t points. After playing of the drop warning animation corresponding to the t points ends, the terminal may play a sphere drop animation corresponding to the t points, so as to indicate that the second virtual sphere is dropped at the t points from the air.

In the embodiment, the match range of the first virtual object and the at least one second virtual object is obtained, the points are selected from each point included in the match range, so that a position where the second virtual sphere needs to drop is automatically determined, the efficiency of determining the drop position is improved, the animation that the second virtual sphere is dropped at the selected points is played, and thus the smoothness in the process of sphere dropping is improved.

In some embodiments, after the step of playing the sphere drop animation corresponding to the t points, the method further includes: the number of playing times of the sphere drop animation is obtained; when the number of playing times is smaller than a target number of times, x points are selected from at least one point, where x is a positive integer; a drop warning animation corresponding to the x points is played, where the drop warning animation corresponding to the x points is used to indicate that the second virtual sphere is about to drop at the x points; and when playing of the drop warning animation corresponding to the x points ends, a sphere drop animation corresponding to the x points is played, where the sphere drop animation corresponding to the x points is used to indicate that the second virtual sphere is dropped at the x points.

The fourth confrontation mode may be that the second virtual sphere is dropped at a plurality of points in turn. The number of the points selected by the terminal each time may be the same or different, that is, x may be equal to t or not. The points selected by the terminal each time are not repeated unless there is no new point to select. The process of dropping the second virtual sphere may include: selecting the points, playing the drop warning animation corresponding to the points, and playing the sphere drop animation corresponding to the points. A duration of playing the drop warning animation and a duration of playing the sphere drop animation may be preset or set as required, for example, the duration of playing the drop warning animation is 2 seconds, and the duration of playing the sphere drop animation is 1 second.

Figure 11:
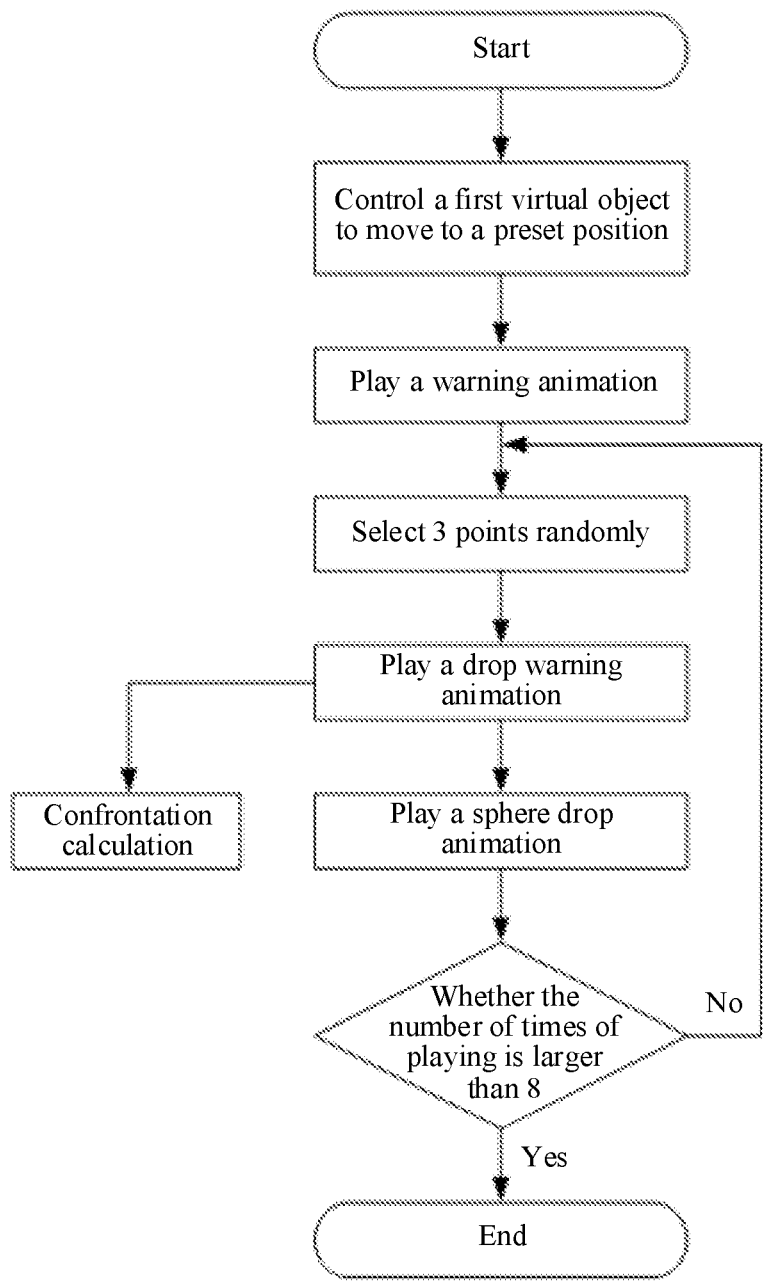
FIG. 11 is a schematic diagram of a process of a confrontation mode provided by yet another embodiment of this application.
Figure 12:
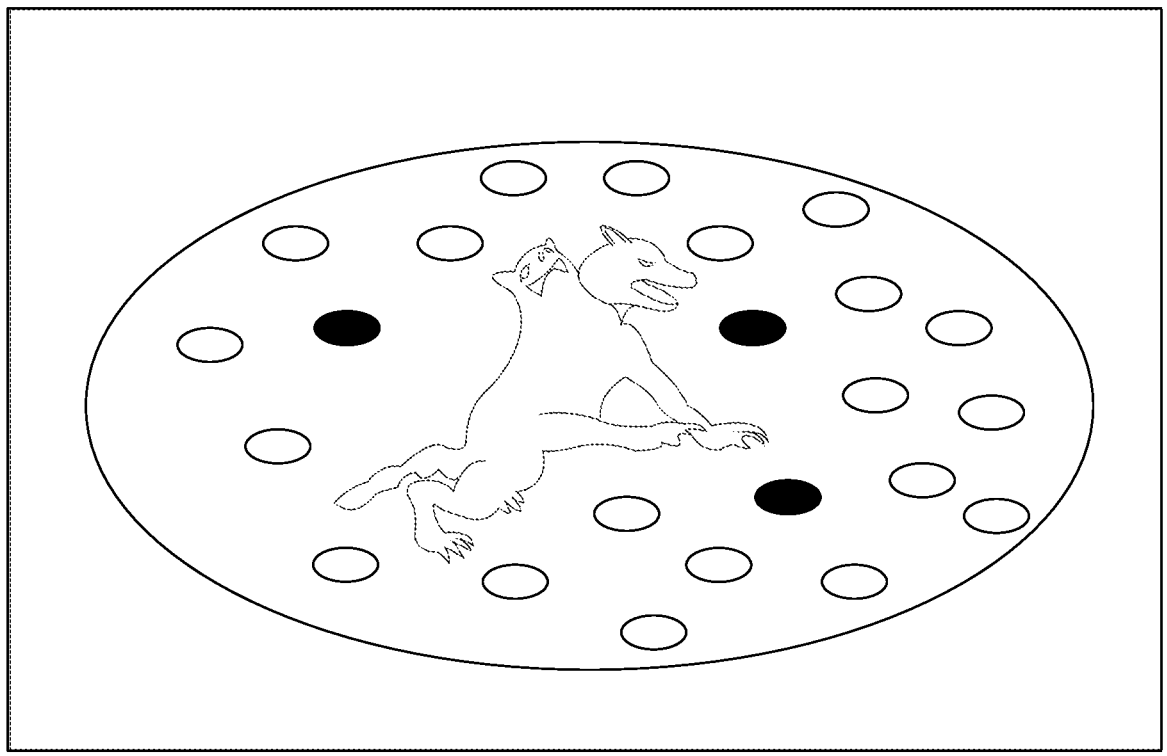
FIG. 12 is a schematic diagram of a warning animation provided by another embodiment of this application.

Taking the situation that the fourth confrontation mode includes confronting with the second virtual sphere dropped in the virtual scene, the target number of times is 8, and 3 points are selected each time as an example, as shown in FIG. 11, before the second virtual sphere is dropped, the first virtual object may be controlled to move to a preset position firstly, for example, a midpoint of the virtual scene, and then a warning animation is played. As shown in FIG. 12, the warning animation shows that the first virtual object roars upward, a flame effect in the virtual scene is strengthened, and some effects such as scene color correction may be made. During or after playing the warning animation, 3 points may be randomly selected from the at least one point included in the virtual scene, a drop warning animation corresponding to the 3 points is played, and the drop warning animation may last for 2 seconds. After playing of the drop warning animation ends, a sphere drop animation is played, and the sphere drop animation may last for 1 second. If the set target number of times is 8, as shown in FIG. 11, whether the number of playing times the sphere drop animation is played is larger than (or equal to) 8 is determined, and if yes, the fourth confrontation mode is stopped; and if no, 3 points are continuously selected, and the above process is repeated. As shown in FIG. 11, after playing the drop warning animation, the sphere drop animation is played, and a confrontation calculation is performed.

In the embodiment, the drop warning animation corresponding to the x points is played, since the drop warning animation corresponding to the x points is used to indicate that the second virtual sphere is about to drop at the x points, a prompt is provided to a user who controls the second virtual object, so that the user can make defense and other processing in time, which improves the efficiency of controlling the second virtual object to defend, and improves the efficiency and smoothness of human-computer interaction.

Figure 13:
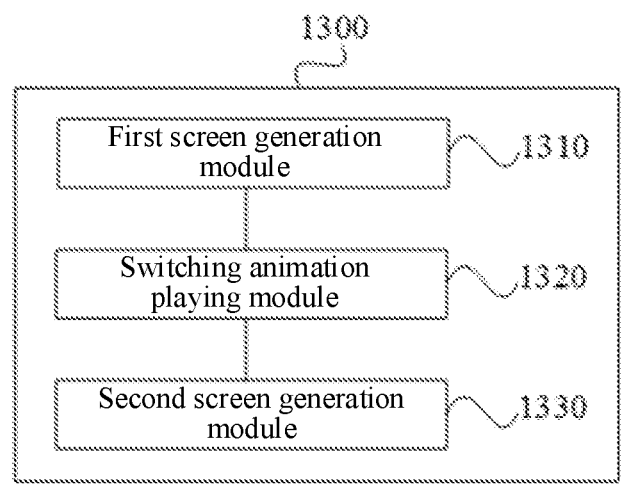
FIG. 13 is a block diagram of a screen generation apparatus provided by an embodiment of this application.

As shown in FIG. 13, a block diagram of a screen generation apparatus provided by an embodiment. The apparatus has functions of implementing the foregoing method embodiments. The functions may be implemented by hardware, or may be implemented by hardware executing corresponding software. The apparatus may be a terminal or may be disposed in a terminal. The apparatus 1300 may include: a first screen generation module 1310, a switching animation playing module 1320, and a second screen generation module 1330.

The first screen generation module 1310 is configured to generate a match screen between a first virtual object and at least one second virtual object, the first virtual object being controlled by a computer device, and the second virtual object being controlled by a user account.

The switching animation playing module 1320 is configured to play an object switching animation when the first virtual object satisfies a target condition, the object switching animation being used to render a generation effect of switching a target virtual part of the first virtual object, so as to obtain a switched first virtual object.

The second screen generation module 1330 is configured to generate a match screen between the switched first virtual object and the at least one second virtual object when playing of the object switching animation ends, where a confrontation mode corresponding to the switched first virtual object is different from a confrontation mode corresponding to the first virtual object.

In some embodiments, the target condition includes a change in an activity capability value interval corresponding to an activity capability value of the first virtual object; the activity capability value interval corresponding to the activity capability value of the first virtual object includes n activity capability value intervals, n activity capability value intervals are continuous and non-overlapping, and n is a positive integer; the switching animation playing module 1320 is configured to: play a $i^{th}$ switching animation when the activity capability value interval corresponding to the activity capability value of the first virtual object is changed from a $i^{th}$ activity capability value interval to a $(i+1)^{th}$ activity capability value interval, and i is a positive integer smaller than n. The object switching animation includes the $i^{th}$ switching animation, and the $i^{th}$ switching animation is used to indicate switching the target virtual part of the first virtual object from a $i^{th}$ generation effect to a $(i+1)^{th}$ generation effect.

In some embodiments, the target virtual part includes a virtual head; the $i^{th}$ generation effect includes the number of the virtual heads is i; and the $(i+1)^{th}$ generation effect includes the number of the virtual heads is (i+1).

Figure 14:
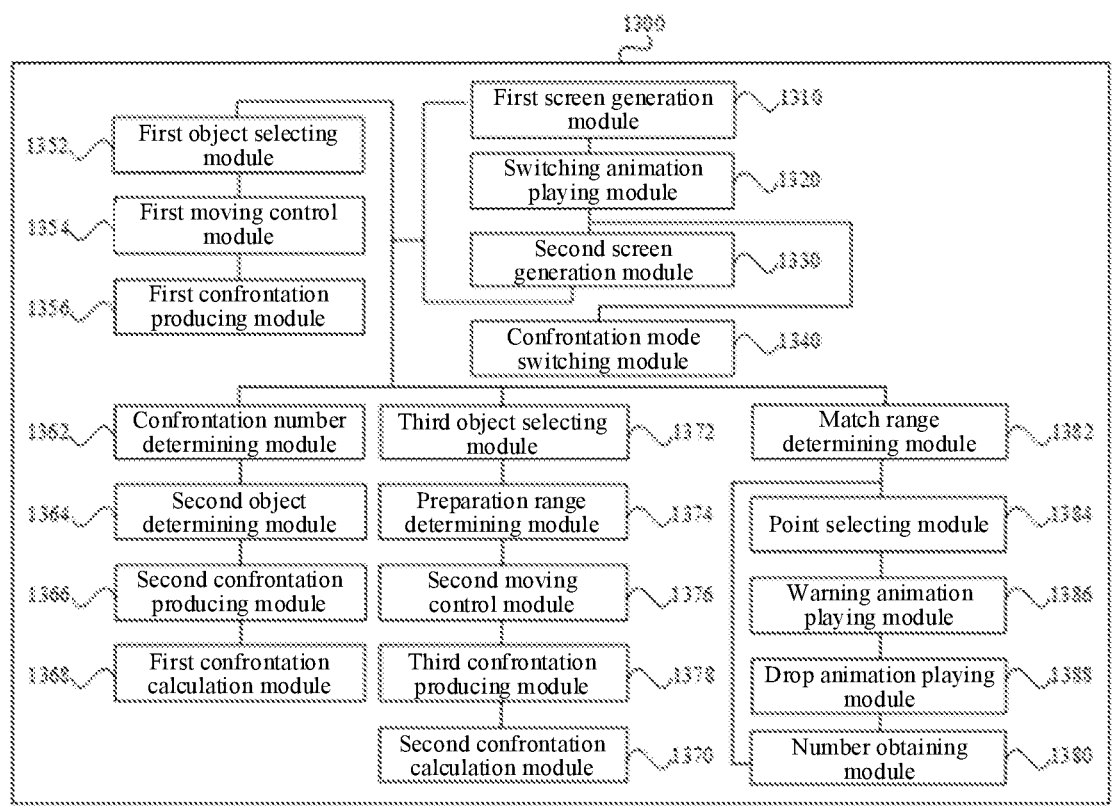
FIG. 14 is block diagram of a screen generation apparatus provided by another embodiment of this application.

In some embodiments, as shown in FIG. 14, the apparatus 1300 further includes: a confrontation mode switching module 1340, configured to switch the confrontation mode corresponding to the first virtual object from a $i^{th}$ type of confrontation mode to a $(i+1)^{th}$ type of confrontation mode when the activity capability value interval corresponding to the activity capability value of the first virtual object is changed from the $i^{th}$ activity capability value interval to the $(i+1)^{th}$ activity capability value interval; and the $(i+1)^{th}$ type of confrontation mode means that m confrontation modes are added on the basis of the confrontation mode included in the $i^{th}$ type of confrontation mode, and m is a positive integer.

In some embodiments, the confrontation mode corresponding to the first virtual object includes a first confrontation mode. As shown in FIG. 14, the apparatus 1300 further includes: a first object selecting module 1352, configured to select a second virtual object that satisfies a first confrontation condition from the at least one second virtual object to obtain a third virtual object; a first moving control module 1354, configured to control the first virtual object to move towards the third virtual object; and a first confrontation producing module 1356, configured to control the first virtual object to confront the third virtual object in the first confrontation mode when the third virtual object falls within a confrontation range of the first virtual object.

In some embodiments, the confrontation mode corresponding to the first virtual object includes a second confrontation mode. As shown in FIG. 14, the apparatus 1300 further includes: a confrontation number determining module 1362, configured to determine the number of confrontations of the second confrontation mode based on the generation effect of the target virtual part of the first virtual object; a second object determining module 1364, configured to determine, as for a $5^{th}$ confrontation in the number of confrontations, a second virtual object corresponding to the $5^{th}$ confrontation from the at least one second virtual object, s being a positive integer; and a second confrontation producing module 1366, configured to control the first virtual object to confront the second virtual object corresponding to the $5^{th}$ confrontation in the second confrontation mode.

In some embodiments, the second confrontation mode includes the first virtual object spraying a first virtual sphere. As shown in FIG. 14, the apparatus 1300 further includes: a first confrontation calculation module 1368, configured to perform an immediate confrontation calculation on a second virtual object within a first calculation range when the first virtual sphere falls on the ground; and after the first virtual sphere falls on the ground, perform a continuous confrontation calculation on a second virtual object within a second calculation range, the second calculation range being larger than the first calculation range.

In some embodiments, the confrontation mode corresponding to the first virtual object includes a third confrontation mode. As shown in FIG. 14, the apparatus 1300 further includes: a third object selecting module 1372, configured to select a second virtual object that satisfies a second confrontation condition from the at least one second virtual object to obtain a fourth virtual object; a preparation range determining module 1374, configured to determine a confrontation preparation range based on position information of the fourth virtual object; a second moving control module 1376, configured to control the first virtual object to move to an edge of the confrontation preparation range and control the first virtual object to move along the edge of the confrontation preparation range; and a third confrontation producing module 1378, configured to control the first virtual object to confront the fourth virtual object in the third confrontation mode when movement satisfies a movement stop condition.

In some embodiments, the third confrontation mode includes the first virtual object launching a charge against the fourth virtual object. As shown in FIG. 14, the apparatus 1300 further includes: a second confrontation calculation module 1370, configured to determine a charging confrontation range in real time based on real-time position information of the first virtual object in the charging process of the first virtual object; and perform an immediate confrontation calculation on a second virtual object within the charging confrontation range.

In some embodiments, the confrontation mode corresponding to the first virtual object includes a fourth confrontation mode, and the fourth confrontation mode includes confronting with a second virtual sphere dropped in the virtual scene. As shown in FIG. 14, the apparatus 1300 further includes: a match range determining module 1382, configured to obtain a match range of the first virtual object and the at least one second virtual object; a point selecting module 1384, configured to select t points from at least one point included in the match range, where t is a positive integer; a warning animation playing module 1386, configured to play a drop warning animation corresponding to the t points, where the drop warning animation corresponding to the t points is used to indicate that the second virtual sphere is about to drop at the t points; and a drop animation playing module 1388, configured to play a sphere drop animation corresponding to the t points when playing of the drop warning animation corresponding to the t points ends, where the sphere drop animation corresponding to the t points is used to indicate that the second virtual sphere is dropped at the t points.

In some embodiments, as shown in FIG. 14, the apparatus 1300 further includes: a number obtaining module 1380, configured to obtain the number of playing times the sphere drop animation is played; the point selecting module 1384, further configured to select x points from at least one point when the number of playing times is smaller than a target number of times, where x is a positive integer; the warning animation playing module 1386, further configured to play a drop warning animation corresponding to the x points, where the drop warning animation corresponding to the x points is used to indicate that the second virtual sphere is about to drop at the x points; and the drop animation playing module 1388, further configured to play a sphere drop animation corresponding to the x points when playing of the drop warning animation corresponding to the x points ends, where the sphere drop animation corresponding to the x points is used to indicate that the second virtual sphere is dropped at the x points.

In the above screen generation apparatus, the match screen between the first virtual object and the second virtual object is generated, when the first virtual object satisfies the target condition, the object switching animation is played, so that the generation effect of the target virtual part of the first virtual object is switched to obtain the switched first virtual object. When playing of the object switching animation ends, the match screen between the switched first virtual object and the at least one second virtual object is generated, since the confrontation mode of the switched first virtual object is different from the confrontation mode of the first virtual object before switching, the confrontation mode of the first virtual object is automatically updated, automatic control of the first virtual object is realized, a control efficiency of the virtual object is improved, so that time for occupying computer resources in the process of controlling the virtual object is shortened, and the computer resources in the process of controlling the virtual object are saved.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same conception. For the specific implementation process, reference may be made to the method embodiments, and details are not described herein again.

Figure 15:
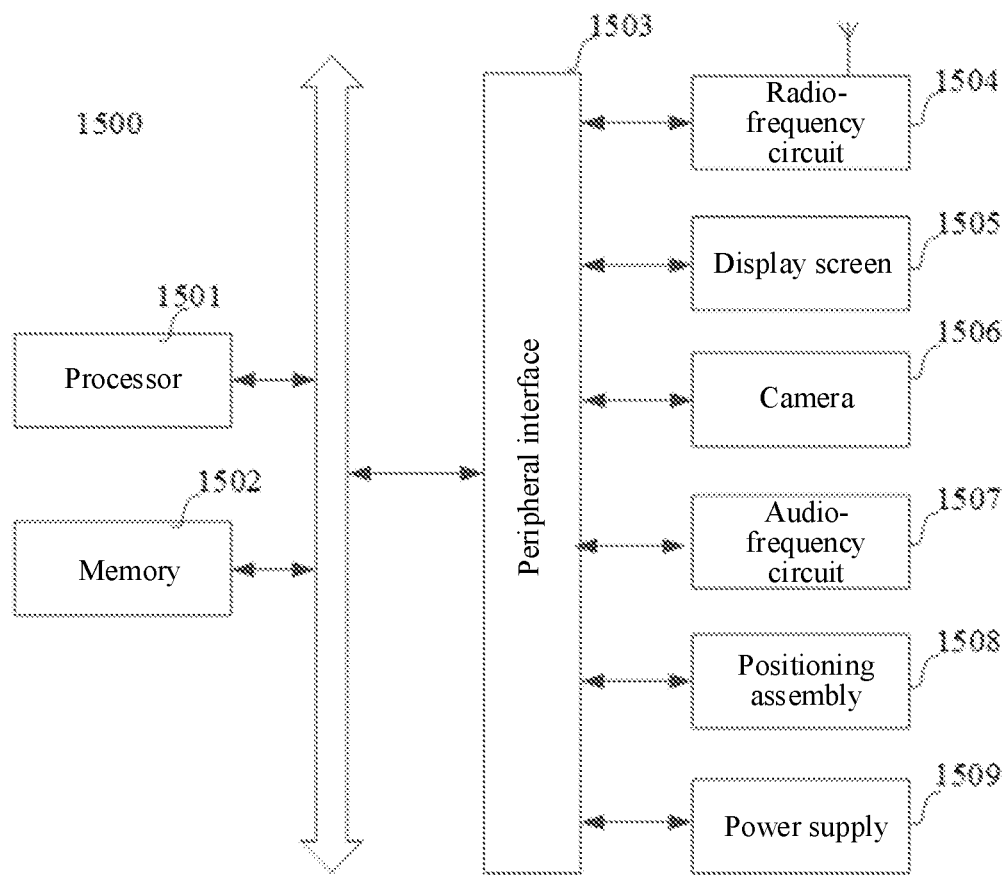
FIG. 15 is a schematic structural diagram of a terminal provided by an embodiment of this application.

FIG. 15 is a structural block diagram of a terminal 1500 according to an embodiment. The terminal 1500 may be a portable electronic device, such as a mobile phone, a tablet computer, a game console, an ebook reader, a multimedia playback device, and a wearable device. The terminal is configured to implement the screen generation method provided in the foregoing embodiments. The terminal may be the terminal 10 in the implementation environment shown in FIG. 1. Specifically, generally, the terminal 1500 includes a processor 1501 and a memory 1502.

The processor 1501 may include one or more processing cores, for example, a 4-core processor or an 8-core processor. The processor 1501 may be implemented by using at least one hardware form of a digital signal processor (DSP), a field programmable gate array (FPGA), and a programmable logic array (PLA). The processor 1501 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1501 may be integrated with a graphics processing unit (GPU). The GPU is configured to be responsible for rendering and drawing content that a display needs to display. In some embodiments, the processor 1501 may further include an artificial intelligence (AI) processor. The AI processor is configured to process computing operations related to machine learning.

The memory 1502 may include one or more computer-readable storage media. The computer-readable storage medium may be non-transient. The memory 1502 may further include a high-speed random access memory (RAM), and a non-volatile memory such as one or more magnetic disk storage devices and a flash storage device. In some embodiments, the non-transient computer-readable storage medium in the memory 1502 is configured to store at least one instruction, at least one program, a code set, or an instruction set, the at least one instruction, the at least one program, the code set, or the instruction set being configured to be executed by one or more processors to implement the foregoing screen generation method.

In some embodiments, the terminal 1500 may further optionally include: a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. Specifically, the peripheral device includes at least one of a radio frequency (RF) circuit 1504, a touch display screen 1505, a camera 1506, an audio circuit 1507, a positioning component 1508, and a power supply 1509.

A person skilled in the art may understand that the structure shown in FIG. 15 does not constitute a limitation to the terminal 1500, and the terminal may include more or fewer components than those shown in the figure, or some components may be combined, or a different component arrangement may be used.

In some embodiments, a computer-readable storage medium is further provided, the storage medium storing at least one instruction, at least one program, a code set, or an instruction set, the at least one instruction, the at least one program, the code set, or the instruction set, when executed by the processor, implementing the foregoing screen generation method.

Optionally, the computer-readable storage medium may include: a ROM, a RAM, a solid state drive (SSD), an optical disc, or the like. The RAM may include a resistance random access memory (ReRAM) and a dynamic random access memory (DRAM).

A computer program product is provided, including computer-readable instructions, where the computer-readable instructions, when executed by a processor, implement the steps of the foregoing screen generation method.

It is to be understood that "plurality of" mentioned in this specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A screen generation method performed by a computer device, the method comprising:
   generating and displaying a first match screen between a first virtual object and at least one second virtual object, the first virtual object being controlled by the computer device, and the second virtual object being controlled by a user account at a second computer device;
   playing an object switching animation when the first virtual object satisfies a target condition, the object switching animation rendering a generation effect of switching a target virtual part of the first virtual object to obtain a switched first virtual object;
   when the playing of the object switching animation ends, replacing the first match screen with a second match screen between the switched first virtual object and the at least one second virtual object when the playing of the object switching animation ends, wherein the target virtual part of the switched first virtual object is visually different from that of the first virtual object while remaining parts of the switched first virtual object remain the same as the first virtual object; and
   updating a confrontation mode corresponding to the switched first virtual object to be different from a confrontation mode corresponding to the first virtual object before the switch.

2. The method according to claim 1, wherein the target condition comprises a change in an activity capability value interval corresponding to the first virtual object; and the activity capability value interval corresponding to the first virtual object comprises n activity capability value intervals, the n activity capability value intervals are continuous and non-overlapping, and n is a positive integer;
   the playing an object switching animation when the first virtual object satisfies a target condition comprises:
   playing a $i^{th}$ switching animation when the activity capability value interval corresponding to the first virtual object is changed from a $i^{th}$ activity capability value interval to a (i+1)th activity capability value interval, i being a positive integer smaller than n; and
   the object switching animation comprises the $i^{th}$ switching animation, and the $i^{th}$ switching animation is used to render the target virtual part of the first virtual object to switch from a $i^{th}$ generation effect to a (i+1)th generation effect.

3. The method according to claim 2, further comprising:
   switching the confrontation mode corresponding to the first virtual object from a $i^{th}$ type of confrontation mode to a (i+1)th type of confrontation mode when the activity capability value interval corresponding to the first virtual object is changed from the $i^{th}$ activity capability value interval to the (i+1)th activity capability value interval, wherein
   the (i+1)th type of confrontation mode means that m confrontation modes are added on the basis of the confrontation mode comprised in the $i^{th}$ type of confrontation mode, and m is a positive integer.

4. The method according to claim 1, wherein the confrontation mode corresponding to the first virtual object comprises a first confrontation mode; and the method further comprises:
   selecting a second virtual object that satisfies a first confrontation condition from the at least one second virtual object to obtain a third virtual object;
   controlling the first virtual object to move toward the third virtual object; and
   controlling the first virtual object to confront the third virtual object in the first confrontation mode when the third virtual object falls within a confrontation range of the first virtual object.

5. The method according to claim 1, wherein the confrontation mode corresponding to the first virtual object comprises a second confrontation mode; and the method further comprises:
   determining a number of confrontations of the second confrontation mode based on the generation effect of switching the target virtual part of the first virtual object;
   determining, as for a $s^{th}$ confrontation in the number of confrontations, a second virtual object corresponding to the $s^{th}$ confrontation from the at least one second virtual object, s being a positive integer; and controlling the first virtual object to confront the second virtual object corresponding to the $s^{th}$ confrontation in the second confrontation mode.

6. The method according to claim 1, wherein the confrontation mode corresponding to the first virtual object comprises a third confrontation mode; and the method further comprises:

selecting a second virtual object that satisfies a second confrontation condition from the at least one second virtual object to obtain a fourth virtual object;

determining a confrontation preparation range based on position information of the fourth virtual object;

controlling the first virtual object to move along an edge of the confrontation preparation range; and controlling the first virtual object to confront the fourth virtual object in the third confrontation mode when the movement satisfies a movement stop condition.

7. The method according to claim 1, wherein the confrontation mode corresponding to the first virtual object comprises a fourth confrontation mode, and the fourth confrontation mode comprises confronting with a second virtual sphere dropped in a virtual scene; and the method further comprises:

obtaining a match range of the first virtual object and the at least one second virtual object;

selecting t points from at least one point comprised in the match range, wherein t is a positive integer;

playing a drop warning animation corresponding to the t points, wherein the drop warning animation corresponding to the t points is used to indicate that the second virtual sphere is about to drop at the t points; and playing a sphere drop animation corresponding to the t points when playing of the drop warning animation corresponding to the t points ends, wherein the sphere drop animation corresponding to the t points is used to indicate that the second virtual sphere is dropped to the t points.

8. A computer device, comprising a memory and one or more processors, the memory storing computer-readable instructions, the computer-readable instructions, when executed by the one or more processors, causing the computer device to perform a screen generation method including:

generating and displaying a first match screen between a first virtual object and at least one second virtual object, the first virtual object being controlled by the computer device, and the second virtual object being controlled by a user account at a second computer device;

playing an object switching animation when the first virtual object satisfies a target condition, the object switching animation rendering a generation effect of switching a target virtual part of the first virtual object to obtain a switched first virtual object;

when the playing of the object switching animation ends, replacing the first match screen with a second match screen between the switched first virtual object and the at least one second virtual object when the playing of the object switching animation ends, wherein the target virtual part of the switched first virtual object is visually different from that of the first virtual object while remaining parts of the switched first virtual object remain the same as the first virtual object; and updating a confrontation mode corresponding to the switched first virtual object to be different from a confrontation mode corresponding to the first virtual object before the switch.

9. The computer device according to claim 8, wherein the target condition comprises a change in an activity capability value interval corresponding to the first virtual object; and the activity capability value interval corresponding to the first virtual object comprises n activity capability value intervals, the n activity capability value intervals are continuous and non-overlapping, and n is a positive integer;

the playing an object switching animation when the first virtual object satisfies a target condition comprises:

playing a $i^{th}$ switching animation when the activity capability value interval corresponding to the first virtual object is changed from a $i^{th}$ activity capability value interval to a (i+1)th activity capability value interval, i being a positive integer smaller than n; and the object switching animation comprises the $i^{th}$ switching animation, and the $i^{th}$ switching animation is used to render the target virtual part of the first virtual object to switch from a $i^{th}$ generation effect to a (i+1)th generation effect.

10. The computer device according to claim 9, wherein the method further comprises:

switching the confrontation mode corresponding to the first virtual object from a $i^{th}$ type of confrontation mode to a (i+1)th type of confrontation mode when the activity capability value interval corresponding to the first virtual object is changed from the $i^{th}$ activity capability value interval to the (i+1)th activity capability value interval, wherein the (i+1)th type of confrontation mode means that m confrontation modes are added on the basis of the confrontation mode comprised in the $i^{th}$ type of confrontation mode, and m is a positive integer.

11. The computer device according to claim 8, wherein the confrontation mode corresponding to the first virtual object comprises a first confrontation mode; and the method further comprises:

selecting a second virtual object that satisfies a first confrontation condition from the at least one second virtual object to obtain a third virtual object;

controlling the first virtual object to move toward the third virtual object; and controlling the first virtual object to confront the third virtual object in the first confrontation mode when the third virtual object falls within a confrontation range of the first virtual object.

12. The computer device according to claim 8, wherein the confrontation mode corresponding to the first virtual object comprises a second confrontation mode; and the method further comprises:

determining a number of confrontations of the second confrontation mode based on the generation effect of switching the target virtual part of the first virtual object;

determining, as for a $s^{th}$ confrontation in the number of confrontations, a second virtual object corresponding to the $s^{th}$ confrontation from the at least one second virtual object, s being a positive integer; and controlling the first virtual object to confront the second virtual object corresponding to the $s^{th}$ confrontation in the second confrontation mode.

13. The computer device according to claim 8, wherein the confrontation mode corresponding to the first virtual object comprises a third confrontation mode; and the method further comprises:
- selecting a second virtual object that satisfies a second confrontation condition from the at least one second virtual object to obtain a fourth virtual object;
- determining a confrontation preparation range based on position information of the fourth virtual object;
- controlling the first virtual object to move along an edge of the confrontation preparation range; and
- controlling the first virtual object to confront the fourth virtual object in the third confrontation mode when the movement satisfies a movement stop condition.

14. The computer device according to claim 8, wherein the confrontation mode corresponding to the first virtual object comprises a fourth confrontation mode, and the fourth confrontation mode comprises confronting with a second virtual sphere dropped in a virtual scene; and the method further comprises:
- obtaining a match range of the first virtual object and the at least one second virtual object;
- selecting t points from at least one point comprised in the match range, wherein t is a positive integer;
- playing a drop warning animation corresponding to the t points, wherein the drop warning animation corresponding to the t points is used to indicate that the second virtual sphere is about to drop at the t points; and
- playing a sphere drop animation corresponding to the t points when playing of the drop warning animation corresponding to the t points ends, wherein the sphere drop animation corresponding to the t points is used to indicate that the second virtual sphere is dropped to the t points.

15. One or more non-transitory computer-readable storage media, storing computer-readable instructions, the computer-readable instructions, when executed by one or more processors of a computer device, causing the computer device to implement a screen generation method including:
- generating and displaying a first match screen between a first virtual object and at least one second virtual object, the first virtual object being controlled by the computer device, and the second virtual object being controlled by a user account at a second computer device;
- playing an object switching animation when the first virtual object satisfies a target condition, the object switching animation rendering a generation effect of switching a target virtual part of the first virtual object to obtain a switched first virtual object;
- when the playing of the object switching animation ends, replacing the first match screen with a second match screen between the switched first virtual object and the at least one second virtual object when the playing of the object switching animation ends, wherein the target virtual part of the switched first virtual object is visually different from that of the first virtual object while remaining parts of the switched first virtual object remain the same as the first virtual object; and
- updating a confrontation mode corresponding to the switched first virtual object to be different from a confrontation mode corresponding to the first virtual object before the switch.

16. The non-transitory computer-readable storage media according to claim 15, wherein the target condition comprises a change in an activity capability value interval corresponding to the first virtual object; and the activity capability value interval corresponding to the first virtual object comprises n activity capability value intervals, the n activity capability value intervals are continuous and non-overlapping, and n is a positive integer;
- the playing an object switching animation when the first virtual object satisfies a target condition comprises:
- playing a $i^{th}$ switching animation when the activity capability value interval corresponding to the first virtual object is changed from a $i^{th}$ activity capability value interval to a $(i+1)$th activity capability value interval, i being a positive integer smaller than n; and
- the object switching animation comprises the $i^{th}$ switching animation, and the $i^{th}$ switching animation is used to render the target virtual part of the first virtual object to switch from a $i^{th}$ generation effect to a $(i+1)$th generation effect.

17. The non-transitory computer-readable storage media according to claim 15, wherein the confrontation mode corresponding to the first virtual object comprises a first confrontation mode; and the method further comprises:
- selecting a second virtual object that satisfies a first confrontation condition from the at least one second virtual object to obtain a third virtual object;
- controlling the first virtual object to move toward the third virtual object; and
- controlling the first virtual object to confront the third virtual object in the first confrontation mode when the third virtual object falls within a confrontation range of the first virtual object.

18. The non-transitory computer-readable storage media according to claim 15, wherein the confrontation mode corresponding to the first virtual object comprises a second confrontation mode; and the method further comprises:
- determining a number of confrontations of the second confrontation mode based on the generation effect of switching the target virtual part of the first virtual object;
- determining, as for a $s^{th}$ confrontation in the number of confrontations, a second virtual object corresponding to the $s^{th}$ confrontation from the at least one second virtual object, s being a positive integer; and
- controlling the first virtual object to confront the second virtual object corresponding to the $s^{th}$ confrontation in the second confrontation mode.

19. The non-transitory computer-readable storage media according to claim 15, wherein the confrontation mode corresponding to the first virtual object comprises a third confrontation mode; and the method further comprises:
- selecting a second virtual object that satisfies a second confrontation condition from the at least one second virtual object to obtain a fourth virtual object;
- determining a confrontation preparation range based on position information of the fourth virtual object;
- controlling the first virtual object to move along an edge of the confrontation preparation range; and
- controlling the first virtual object to confront the fourth virtual object in the third confrontation mode when the movement satisfies a movement stop condition.

20. The non-transitory computer-readable storage media according to claim 15, wherein the confrontation mode corresponding to the first virtual object comprises a fourth confrontation mode, and the fourth confrontation mode comprises confronting with a second virtual sphere dropped in a virtual scene; and the method further comprises:
- obtaining a match range of the first virtual object and the at least one second virtual object;

selecting t points from at least one point comprised in the match range, wherein t is a positive integer;

playing a drop warning animation corresponding to the t points, wherein the drop warning animation corresponding to the t points is used to indicate that the second virtual sphere is about to drop at the t points; and playing a sphere drop animation corresponding to the t points when playing of the drop warning animation corresponding to the t points ends, wherein the sphere drop animation corresponding to the t points is used to indicate that the second virtual sphere is dropped to the t points.

* * * * *